(12) United States Patent
Kamath et al.

(10) Patent No.: US 8,811,565 B2
(45) Date of Patent: Aug. 19, 2014

(54) INTEGRATED REACTOR MISSILE SHIELD AND CRANE ASSEMBLY

(75) Inventors: Harish Kamath, San Ramon, CA (US); James R. Harris, Jr., Madison Heights, VA (US); Ravi Baliga, Danville, CA (US)

(73) Assignee: Areva Inc., Lynchburg, VA (US)

( * ) Notice: Subject to any disclaimer, the term of this patent is extended or adjusted under 35 U.S.C. 154(b) by 498 days.

(21) Appl. No.: 13/190,511

(22) Filed: Jul. 26, 2011

(65) Prior Publication Data

US 2012/0027155 A1 Feb. 2, 2012

Related U.S. Application Data

(60) Provisional application No. 61/369,583, filed on Jul. 30, 2010.

(51) Int. Cl.
| | |
|---|---|
| *G21C 11/00* | (2006.01) |
| *G21C 7/20* | (2006.01) |
| *G21C 9/00* | (2006.01) |
| *G21C 19/20* | (2006.01) |
| *G21C 7/00* | (2006.01) |

(52) U.S. Cl.
CPC ............... *G21C 11/00* (2013.01); *G21C 19/20* (2013.01); *Y02E 30/40* (2013.01)
USPC ........... 376/287; 376/207; 376/219; 376/234; 376/260; 376/277

(58) Field of Classification Search
CPC ...... G21C 13/02; G21C 13/06; G21C 13/073; G21C 11/00; F41H 5/06; F41H 5/12; F41H 5/14
USPC ......... 376/260–263, 277, 287–296, 207, 219, 376/234; 212/71, 343–346; 105/238.1, 355, 105/358–362; 89/36.01, 36.07, 36.09; 160/130, 133, 136, 137, 181, 201–209
See application file for complete search history.

(56) References Cited

U.S. PATENT DOCUMENTS

| | | | | |
|---|---|---|---|---|
| 786,841 | A * | 4/1905 | Record | 160/137 |
| 2,946,461 | A * | 7/1960 | Slezak et al. | 212/343 |
| 3,752,737 | A * | 8/1973 | Frisch et al. | 376/287 |
| 3,936,219 | A * | 2/1976 | Holmes | 376/287 |
| 3,940,628 | A | 2/1976 | Stock et al. | |
| 3,972,420 | A | 8/1976 | Stock et al. | |
| 3,994,239 | A * | 11/1976 | Baker et al. | 105/358 |
| 4,200,172 | A | 4/1980 | Meuschke et al. | |
| 4,830,814 | A | 5/1989 | Altman | |
| 5,078,957 | A | 1/1992 | Tower et al. | |
| 5,692,551 | A * | 12/1997 | Blunt et al. | 160/136 |
| 5,715,288 | A * | 2/1998 | Matteson | 376/263 |
| 6,061,415 | A * | 5/2000 | Harkness et al. | 376/287 |
| 6,618,460 | B2 * | 9/2003 | Baliga et al. | 376/261 |
| 6,845,701 | B2 * | 1/2005 | Drackett | 89/36.09 |
| 7,139,359 | B2 | 11/2006 | Baliga et al. | |
| 7,567,645 | B2 | 7/2009 | Baliga | |

\* cited by examiner

*Primary Examiner* — Bernarr Gregory
(74) *Attorney, Agent, or Firm* — Sean P. O'Hanlon, Esq., PLLC

(57) ABSTRACT

An integrated reactor missile shield and crane assembly (IRMSCA) is disclosed and claimed. The IRMSCA replaces the existing concrete missile shields and reactor services crane. The IRMSCA is moveable such that the missile shield can be moved away from the reactor head, allowing the integral crane to lift the control rod drive mechanism components and other routine loads at the refueling cavity.

10 Claims, 45 Drawing Sheets

INTEGRATED REACTOR MISSILE SHIELD AND CRANE ASSEMBLY

CROSS-REFERENCE TO RELATED APPLICATIONS

This patent application claims the benefit of U.S. Provisional Patent Application No. 61/369,583 filed on Jul. 30, 2010, which is incorporated herein by reference in its entirety.

BACKGROUND OF THE INVENTION

1. Field of the Invention

The present invention relates to an integrated reactor missile shield and crane assembly.

2. Description of the Related Art

Pressure vessels containing fuel assemblies in commercial nuclear reactor facilities, such as pressurized water reactors (PWRs), have control rods which are operated by control rod drive mechanism assemblies (CRDMs). The CRDMs are mechanically supported on a removable closure head bolted to the pressure vessel and laterally supported by a seismic support platform and vertically restrained by a missile shield. Missile shields are generally relatively large heavy concrete or metal structures designed to absorb kinetic energy from dislocated CRDMs or other objects originally attached to the reactor pressure vessel.

Each of these components is typically designed and installed as a permanent fixture to perform designated functions during plant operation. However, during refueling of the reactor, the closure head, CRDM assemblies and their supporting subsystems, missile shield and other devices located over the closure head must be disassembled and moved in order to remove the reactor vessel closure head from the reactor vessel.

Typically, as the missile shields and other components are heavy loads, their rigging and handling is a time consuming process and requires use of the reactor building polar crane. Disassembling and moving the missile shields is a complex and potentially dangerous undertaking; many industry events (mishaps) have occurred during missile shield handling.

Numerous missile shield designs have been installed to improve efficiencies and accommodate the various nuclear power plant configurations. One such design provides a missile shield that is a hinged steel structure, and which is rotated clear of the reactor. In another such design, the missile shield rolls along the rails used by the fuel handling bridge (FHB).

At some nuclear power plants, a rolling missile shield would not be practical on the FHB rails, which are crossed by many CRDM cables, head vents, and component cooling water (CCW) piping. At the FHB elevation, a rolling missile shield would interfere with extensive CRDM activities that are routine for such a nuclear power plant.

SUMMARY OF THE INVENTION

The integrated reactor missile shield and crane assembly (IRMSCA) of the present invention will traverse the rails atop the D-ring (bio-shield) walls, and it replaces the existing concrete missile shields and reactor services crane. Alternatively, the IRMSCA can be configured to traverse the D-ring walls themselves, such that the IRMSCA can be used in plants that do not have rails atop the D-ring wall. The IRMSCA fully integrates their functions, and the new assembly has improved capabilities that will facilitate refueling outage (RFO) activities. By eliminating the rigging, handling, and storage of the huge missile shields, IRMSCA improves personnel safety, frees the polar crane, and reduces RFO durations. Further RFO flexibility and schedule improvements are gained by the extended capabilities of the integral reactor services crane, which can be used to lift the CRDM components and the other routine loads at the refueling cavity.

DESCRIPTION OF THE DRAWINGS

The present invention is described with reference to the accompanying drawings, in which like reference characters reference like elements, and wherein.

DETAILED DESCRIPTION OF THE INVENTION

Figure 1:
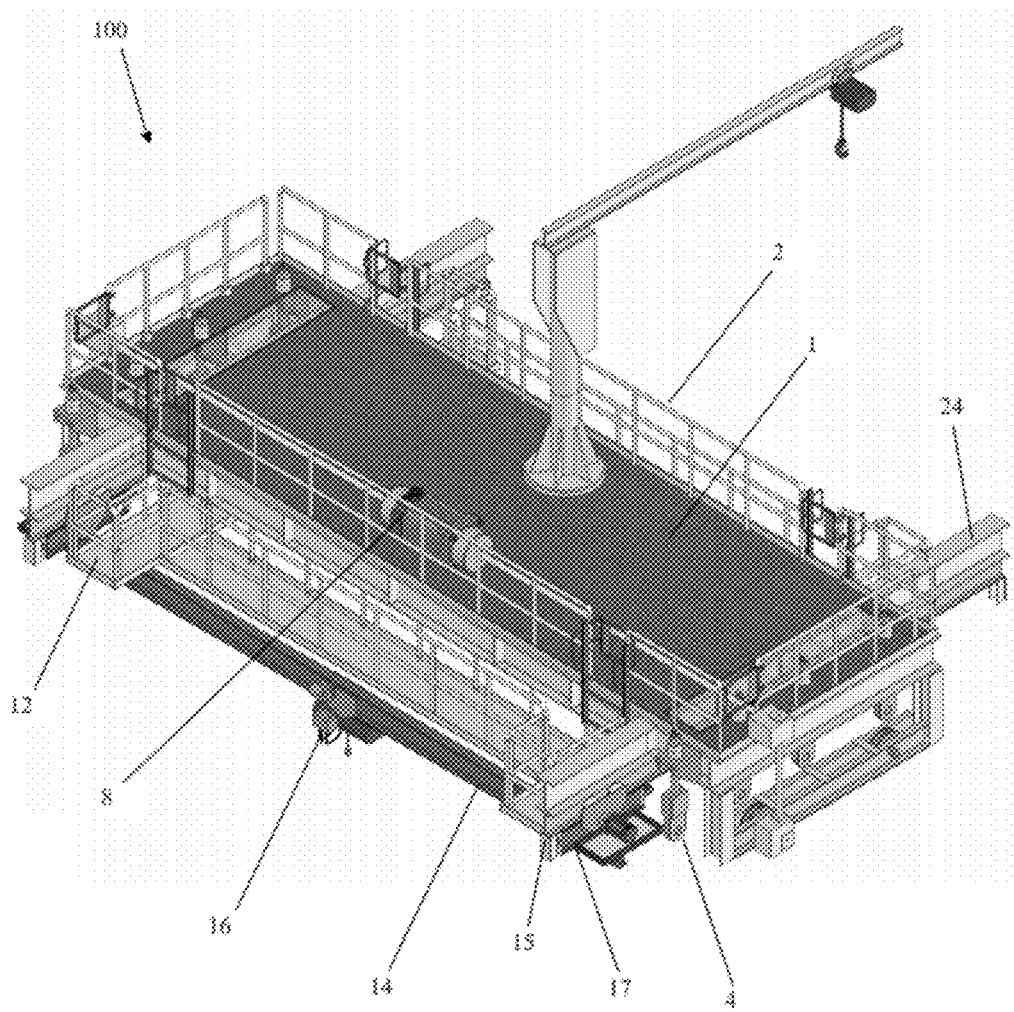
FIG. 1 shows an isometric view (top) of an IRMSCA of the present invention.
Figure 11:
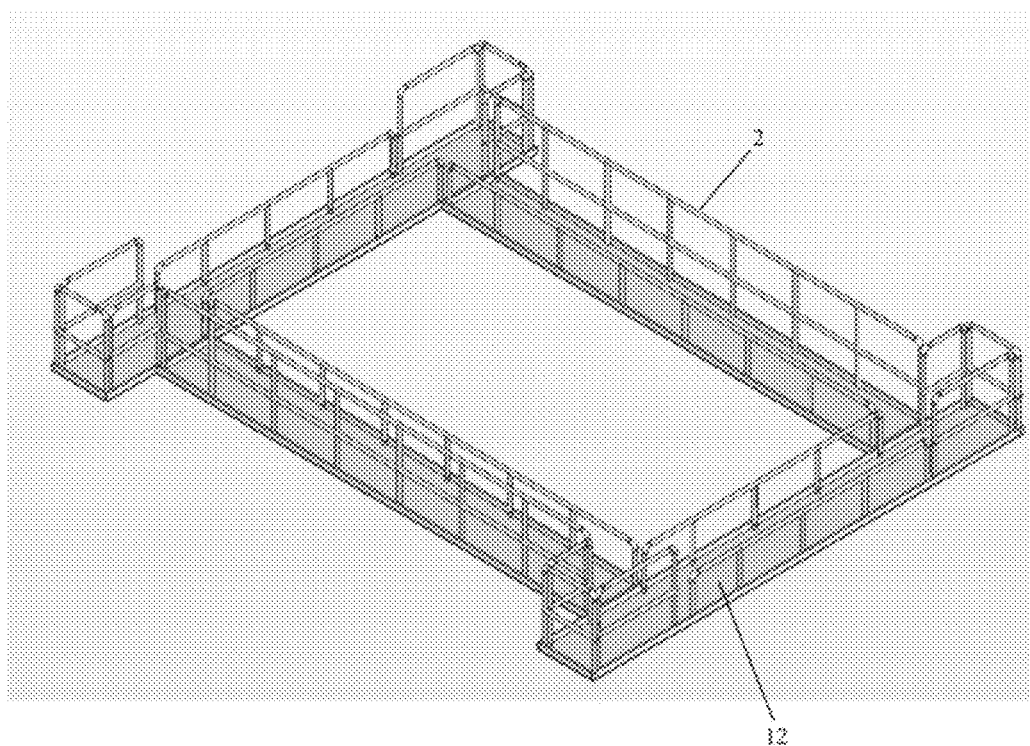
FIG. 11 shows a catwalk of the IRMSCA of FIG. 1.
Figure 12:
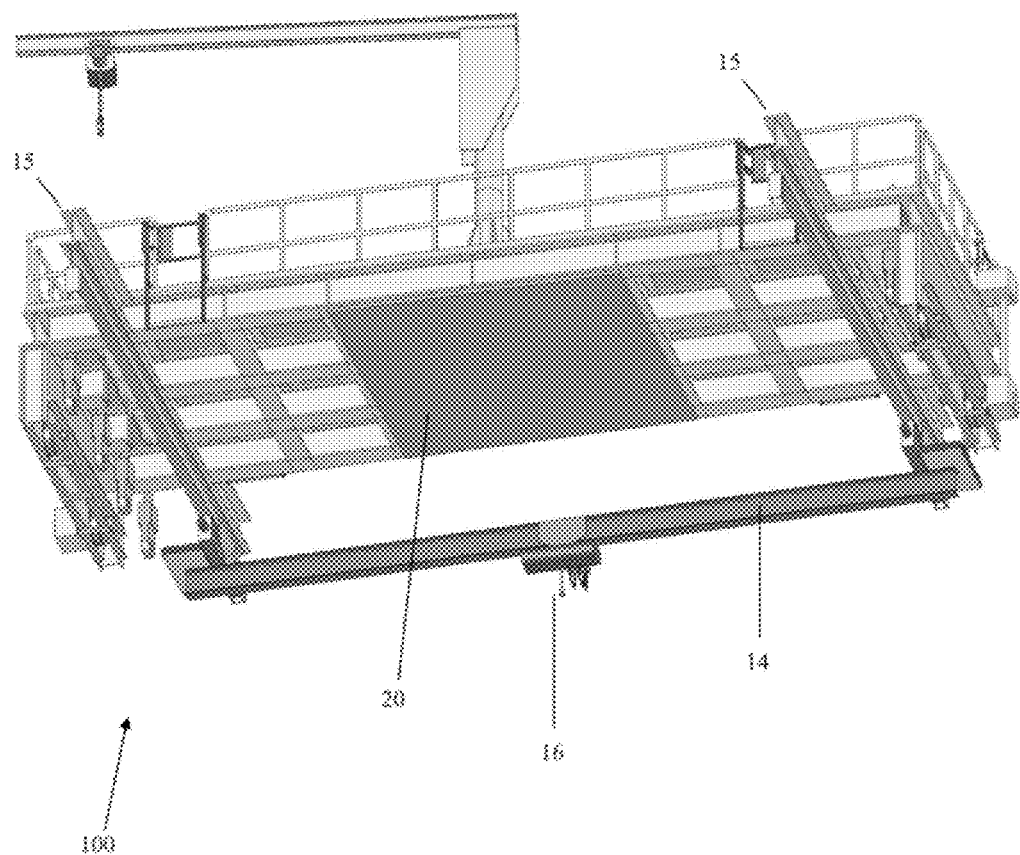
FIG. 12 shows an isometric view (bottom) of the IRMSCA of FIG. 1.

The present invention relates to an integrated reactor missile shield and crane assembly. FIG. 1 shows an isometric view (top) of an IRMSCA 100 of the present invention, and FIG. 12 shows an isometric view (bottom) of the IRMSCA 100. The IRMSCA 100 includes a number of components, including a support frame 1, a handrail 2, a plurality of clevises 4, a motor 8, a catwalk 12, a monorail 14, a rail extension 15, a hoist 16, and a suspension crane 17. During plant operation, the IRMSCA devises 4 are anchored to the D-rings that form a part of the containment building structure. Atop the support frame 1 is a floor plate, and the missile shield 20 plate is attached to its lower surface as illustrated in FIG. 12. The floor plate provides access to the IRMSCA 100 and both D-rings. For ease of illustration, the catwalk 12 is not shown in the view illustrated in FIG. 12; FIG. 11 shows a detailed view of the catwalk 12, which is used to access the suspension crane 17. Handrails 2 are included for personnel safety.

During a refueling outage, the IRMSCA 100 is disengaged from the anchorage and it can function as a crane. Preferably, the IRMSCA 100 rolls along rails 24 atop the D-ring 25 using the drive motor 8. Alternatively, the IRMSCA 100 can be configured to traverse the D-ring walls themselves, such that the IRMSCA 100 can be used in plants that do not have rails 24 atop the D-ring wall 25. A minimum working load limit (WLL) of 7.5 tons ensures it can handle most of the reactor services routine lifts. Rails 15 extend beyond either end of the support frame 1 to permit material handling between both ends of the cavity and refuel floor. The extended reach of the IRMSCA 100 will speed material handling at the cavity, and use of the polar crane is eliminated for these typical RFO activities.

Figure 10:
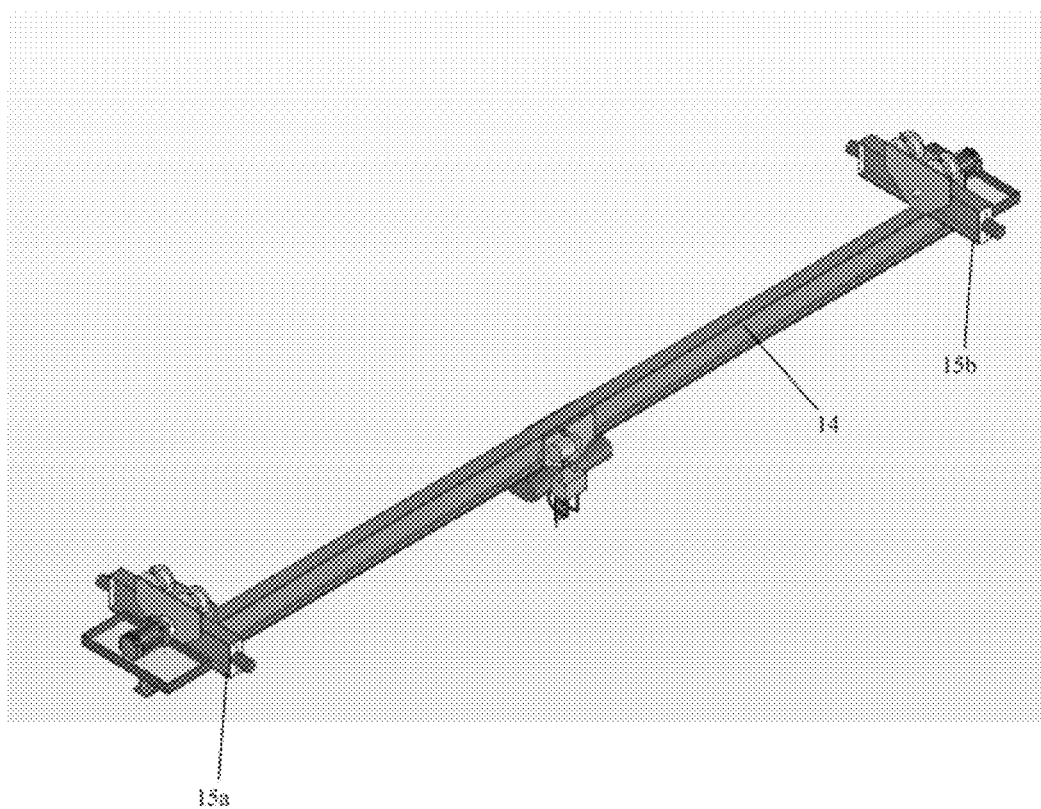
FIG. 10 shows a suspension crane of the IRMSCA of FIG. 1.

As shown most clearly in FIGS. 10 and 12, the hoist 16 is connected to a hoist rail 14. The hoist 16 is moveable along the rail 14 by a hoist motor that is operatively coupled to the hoist 16 and the hoist rail 14 to translate the hoist 16 along the hoist rail 14 in a first direction. The hoist rail 14 is elongate having a first end and a second end. The hoist rail ends are respectively coupled to a first transverse rail 15a and a second transverse rail 15b, which are coupled to the support frame 1 and positioned substantially transverse to the hoist rail 14. The hoist rail 14 is moveable along the transverse rails 15 in a second direction, transverse to the first direction, by one or more motors that operative connect the transverse rails 15 and the support frame 1. Preferably, the transverse rails 15 extend outward away from the IRMSCA 100. This extension increases the reach of the hoist 16, allowing it to be used to lift equipment from a greater range of storage locations. In this manner, the IRMSCA 100 can be used to access and move equipment that is outside of the D-ring wall 25.

Figure 2:
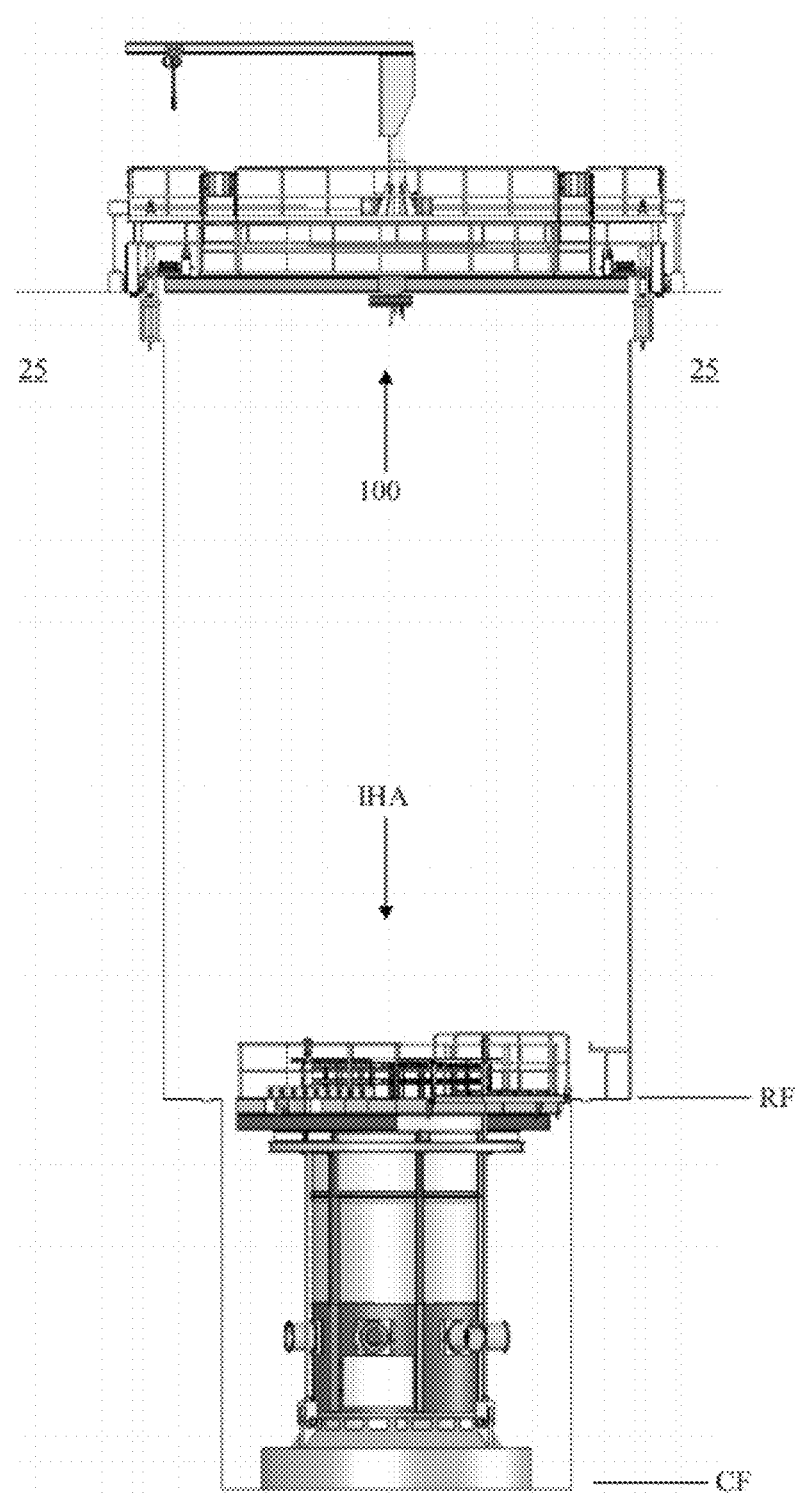
FIG. 2 shows an elevation view (operating plant configuration) of the IRMSCA of FIG. 1.
Figure 3:
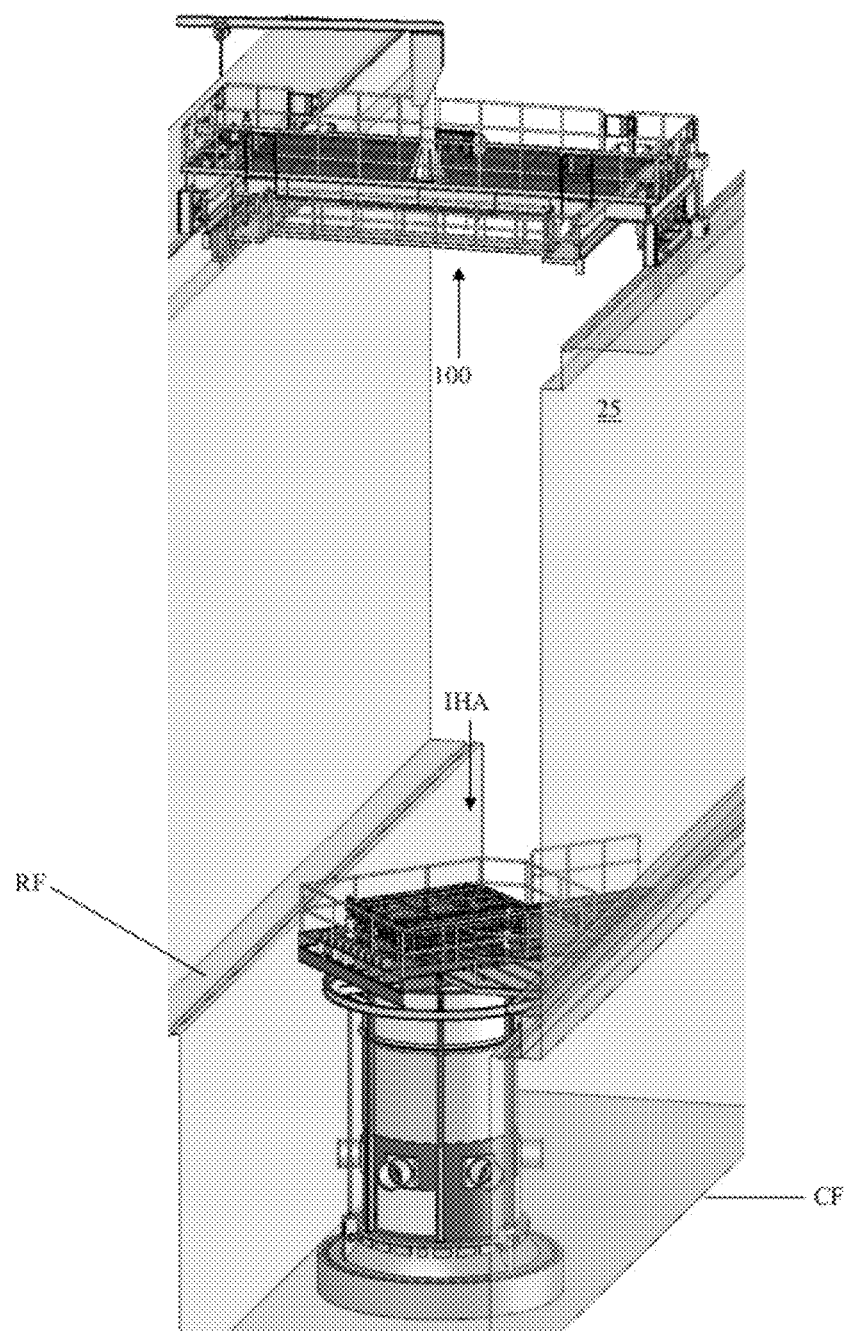
FIG. 3 shows an isometric view (operating plant configuration) of the IRMSCA of FIG. 1.

FIG. 2 shows an elevation view (operating plant configuration) of the IRMSCA 100. The IRMSCA 100 is anchored to the D-rings 25 towards the top of the illustration, corresponding to their location near the top of the inner containment building wall. The refueling floor RF is shown near the upper portion of the reactor vessel and associated integrated head assembly (IHA), which contains the control rods, CRDMs, and related equipment, and the cavity floor CF is shown at the bottom portion of the reactor vessel. FIG. 3 shows an isometric view (operating plant configuration) of the IRMSCA 100, similarly illustrating the vertical layout of these components.

Figure 4:
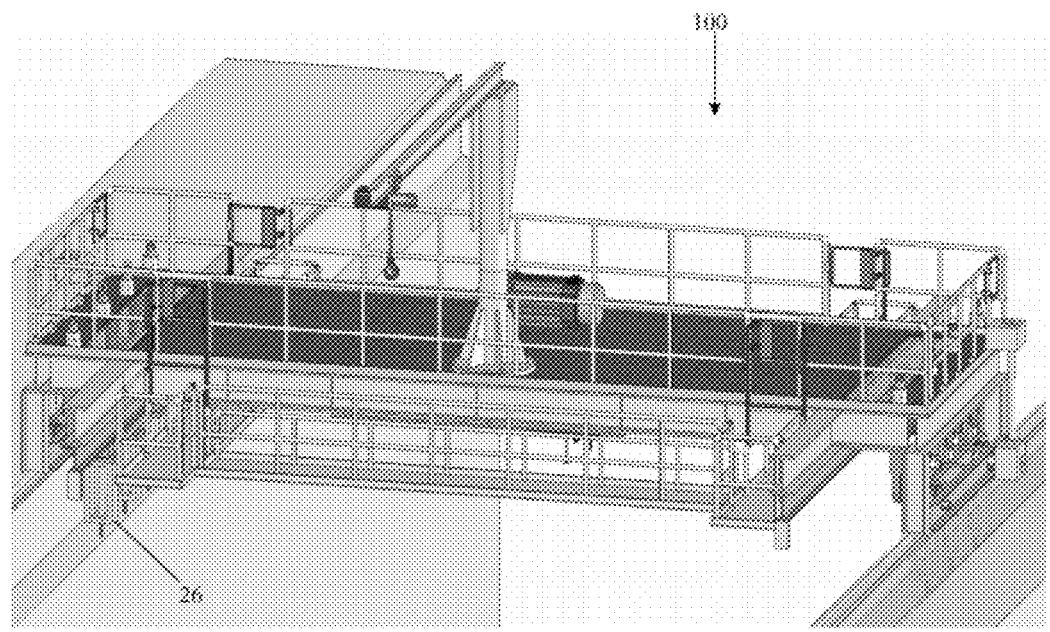
FIG. 4 shows an isometric view (operating plant configuration - near) of the IRMSCA of FIG. 1.
Figure 5:
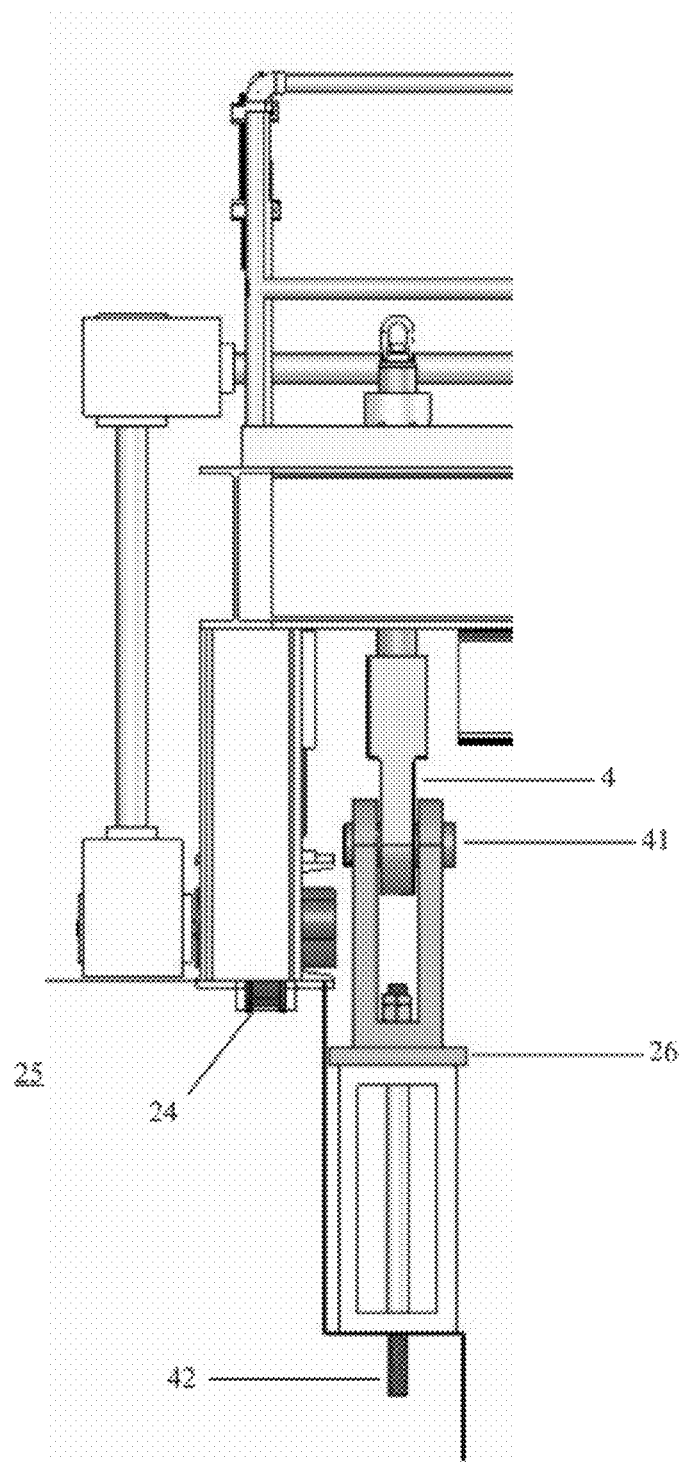
FIG. 5 shows an anchorage detail (operating plant configuration) of the IRMSCA of FIG. 1.
Figure 6:
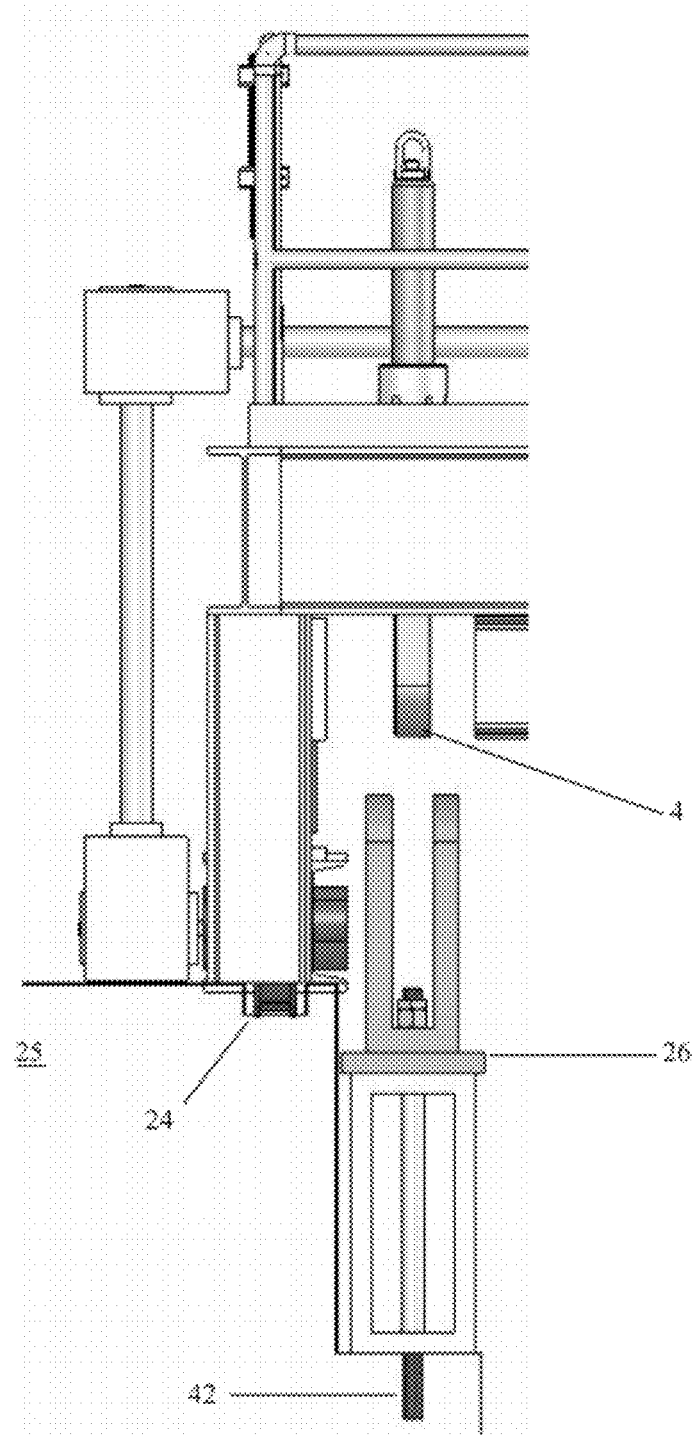
FIG. 6 shows the IRMSCA of FIG. 1 disengaged from its support brackets.
Figure 14:
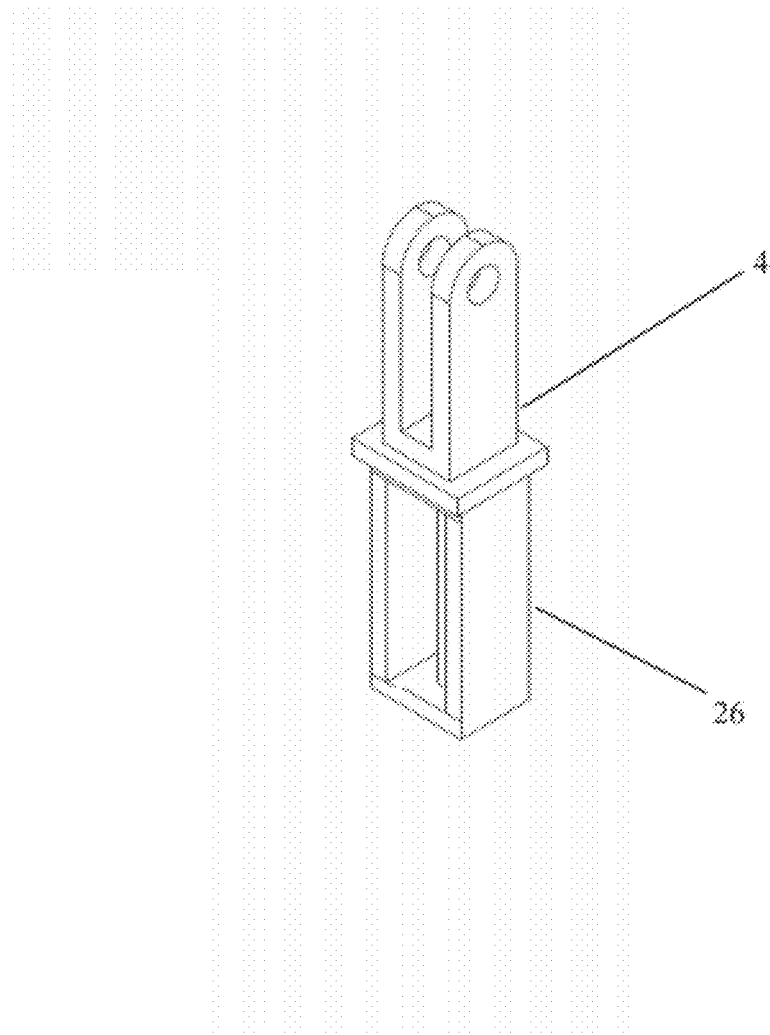
FIG. 14 shows a missile shield support bracket assembly.

FIG. 4 shows an isometric view (operating plant configuration—near) of the IRMSCA 100. During plant operation, the clevises 4 are pinned to the support brackets 26, a preferred embodiment of which is illustrated in more detail in FIG. 14. (For ease of illustration, only one instance of the support brackets 26 is referenced in FIG. 4.) Thus, as illustrated more clearly in FIG. 5, the IRMSCA 100 through clevises 4, clevis pins 41, and support brackets 26, is secured to the D-rings 25 and, thus, the containment building structure. As illustrated, an anchor bolt 42 embedded with the D-ring 25 may be used to securely retain the IRMSCA 100 in place. The anchor bolts 42 should be positioned such that when the IRMSCA 100 is retained in place, the missile shield 20 is located directly above the IHA to protect against any control rods or CRDMs that may become dislodged from the IHA (the typical function of missile shields). As shown in, for example, FIG. 12, the missile shield 20 of the present invention can be much smaller than traditional missile shields. This reduction in size facilitates their movement, further facilitating RFO operations. When the pins 41 are removed, as illustrated in FIG. 6, the clevises 4 can be raised clear of the support brackets 26, rendering the IRMSCA 100 free to roll along the rails 24 atop the D-ring 25. The IRMSCA 100 is still supported by the D-ring 25, but not rigidly so. With clevises 4 so disengaged, the IRMSCA 100 can function as an enhanced reactor services crane.

Figure 40:
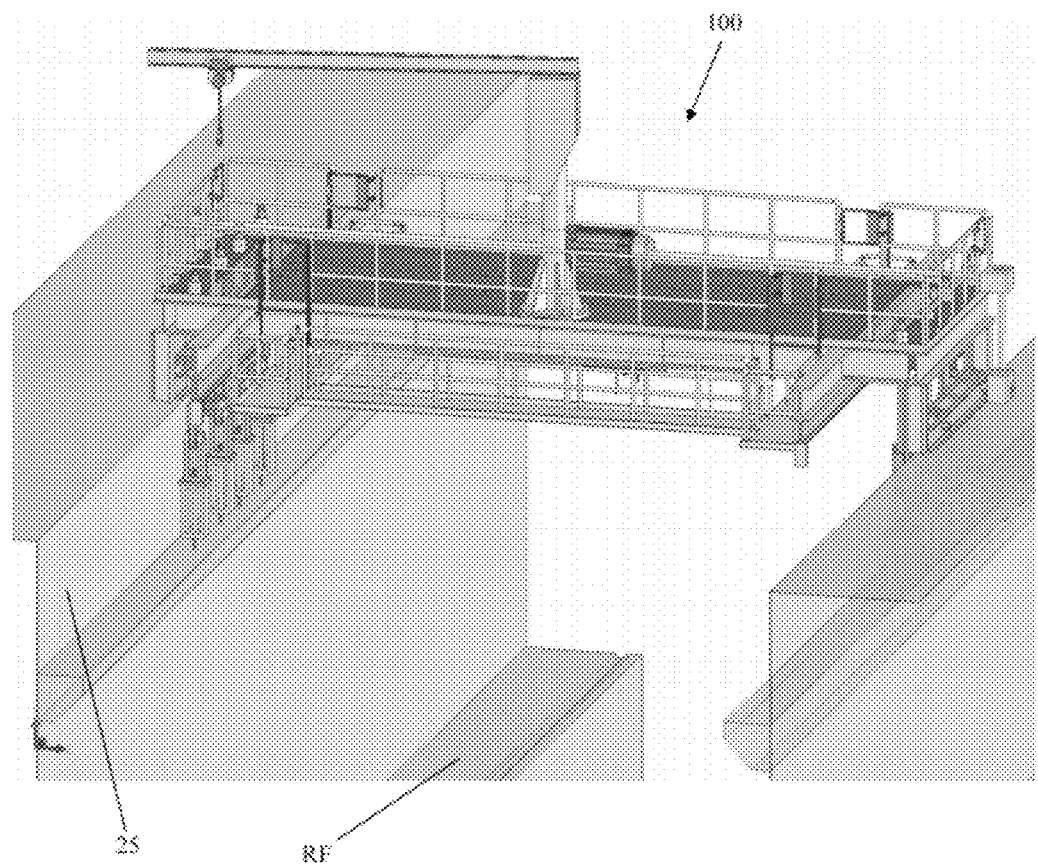
FIG. 40 shows an isometric view of an IRMSCA of the present invention in plant operation configuration.
Figure 41:
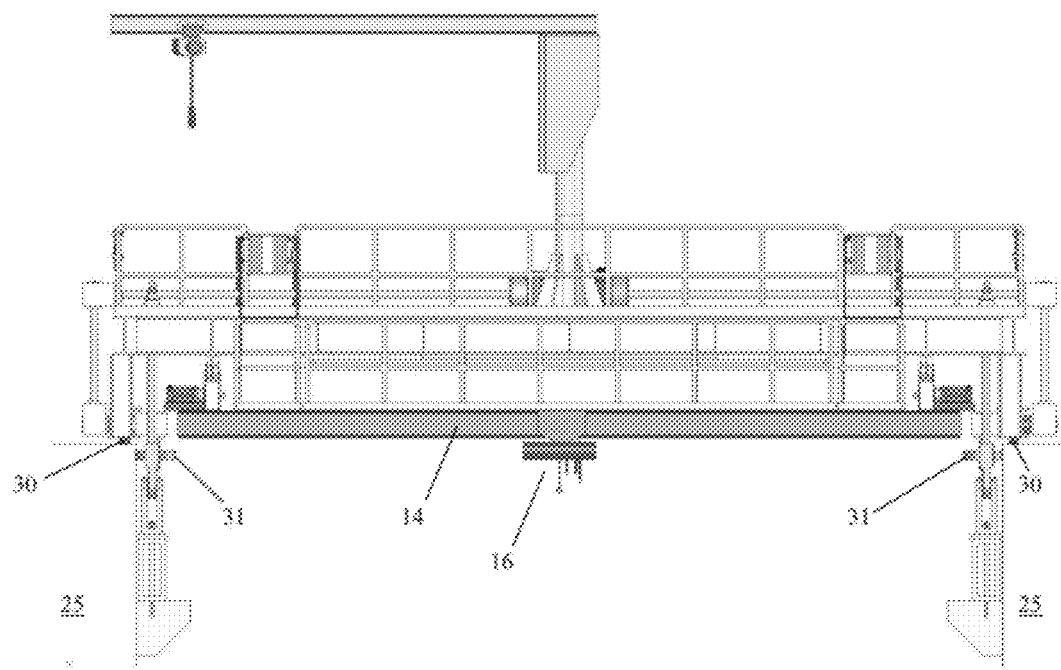
FIG. 41 shows a front elevation view of the IRMSCA of FIG. 40.
Figure 42:
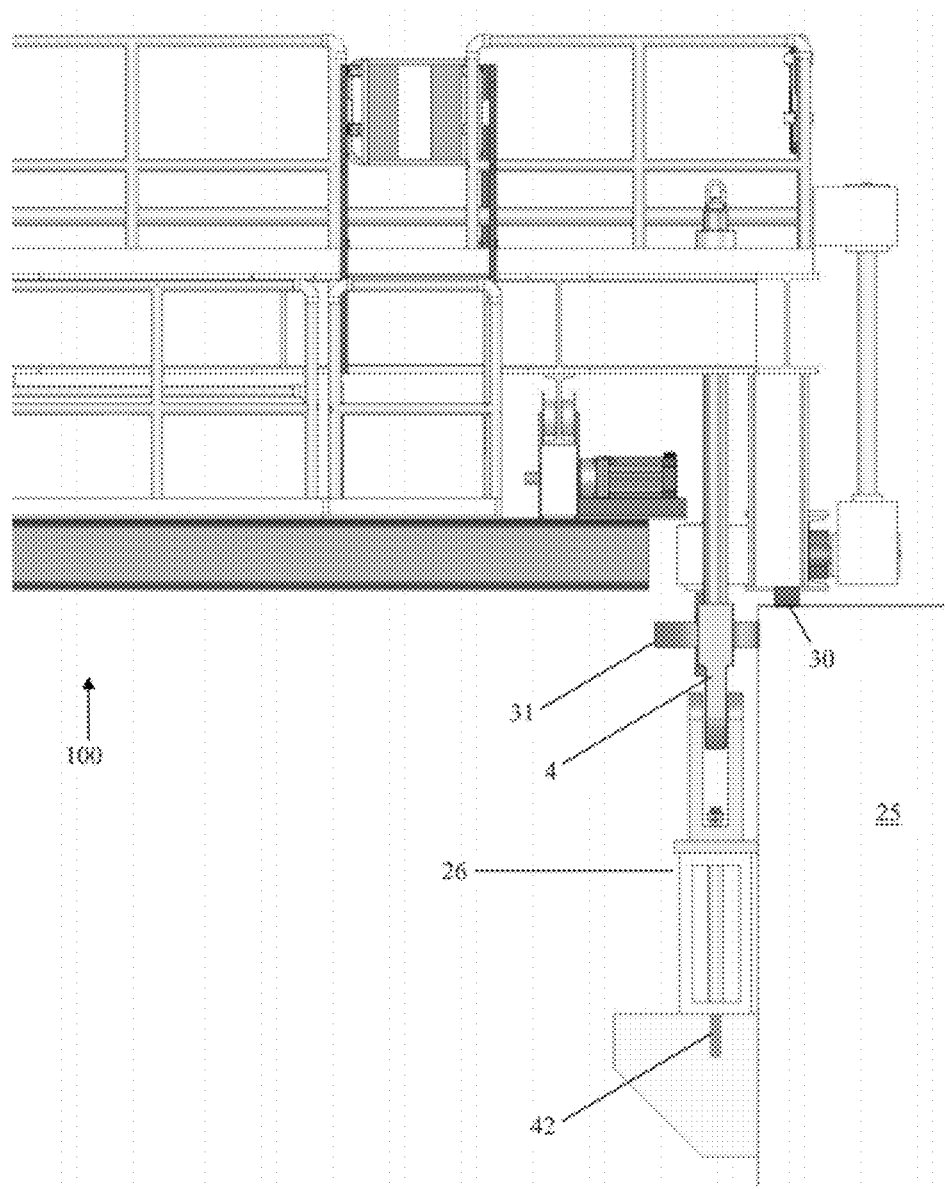
FIG. 42 shows a detailed view of the anchorage of the IRMSCA of FIG. 40.
Figure 43:
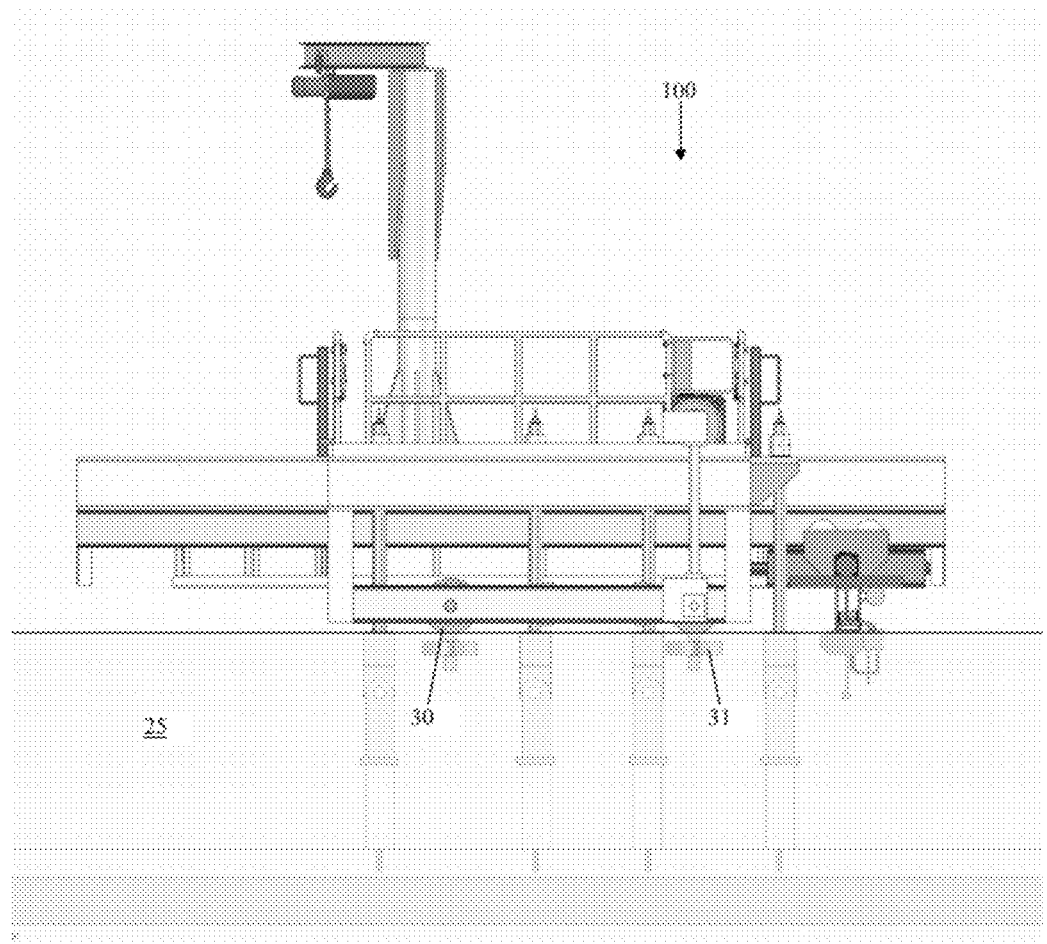
FIG. 43 shows a side elevation view of the IRMSCA of FIG. 40.

Alternatively, the IRMSCA 100 can be configured to traverse the D-ring walls themselves, such that the IRMSCA 100 can be used in plants that do not have rails 24 atop the D-ring wall 25. This embodiment of the IRMSCA 100 is illustrated in FIGS. 40-45. FIG. 40 shows an isometric view of the IRMSCA 100 in the plant operation configuration. It is seen that there are no rails atop the D-ring wall 25. To accommodate this plant configuration, the IRMSCA 100 includes vertical wheels 30 that are in direct contact with the floor of the D-ring wall 25. Additional wheels 31 may be provided on the side of the IRMSCA 100 for horizontal stability between the walls 25. FIG. 41 shows a front elevation view of the IRMSCA 100 affixed to the D-ring wall 25 in the plant operation configuration. FIG. 42 shows a detailed view of the IRMSCA 100 anchorage, which is substantially the same as that of FIG. 5 but with the IRMSCA 100 resting on wheels 30 instead of rails 24. FIG. 43 shows a side elevation view of the IRMSCA 100 affixed to the D-ring wall 25 in the plant operation configuration. The wheels 30, 31 are seen to be in contact with the D-ring wall 25.

Figure 44:
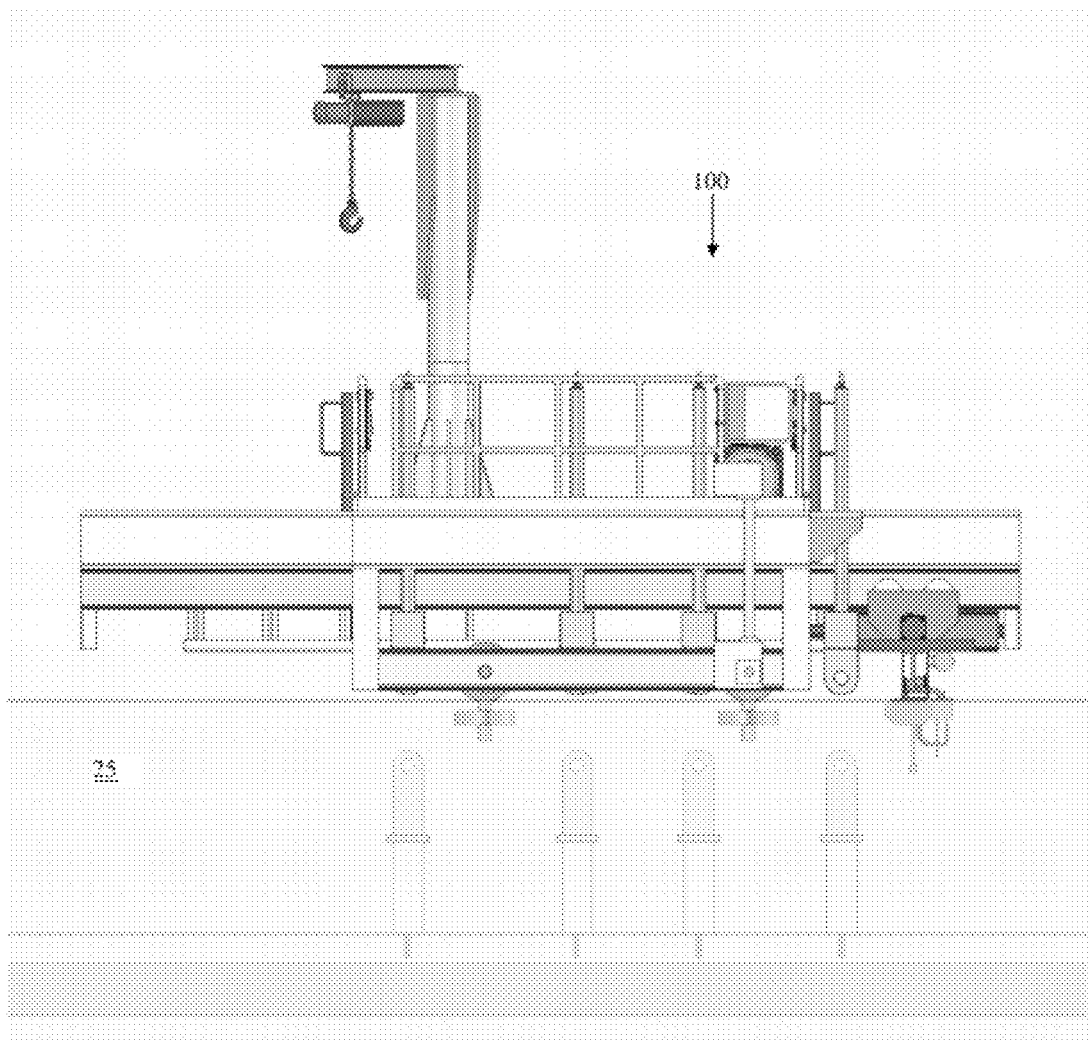
FIG. 44 shows a side elevation view of the IRMSCA of FIG. 40 in refueling configuration.
Figure 45:
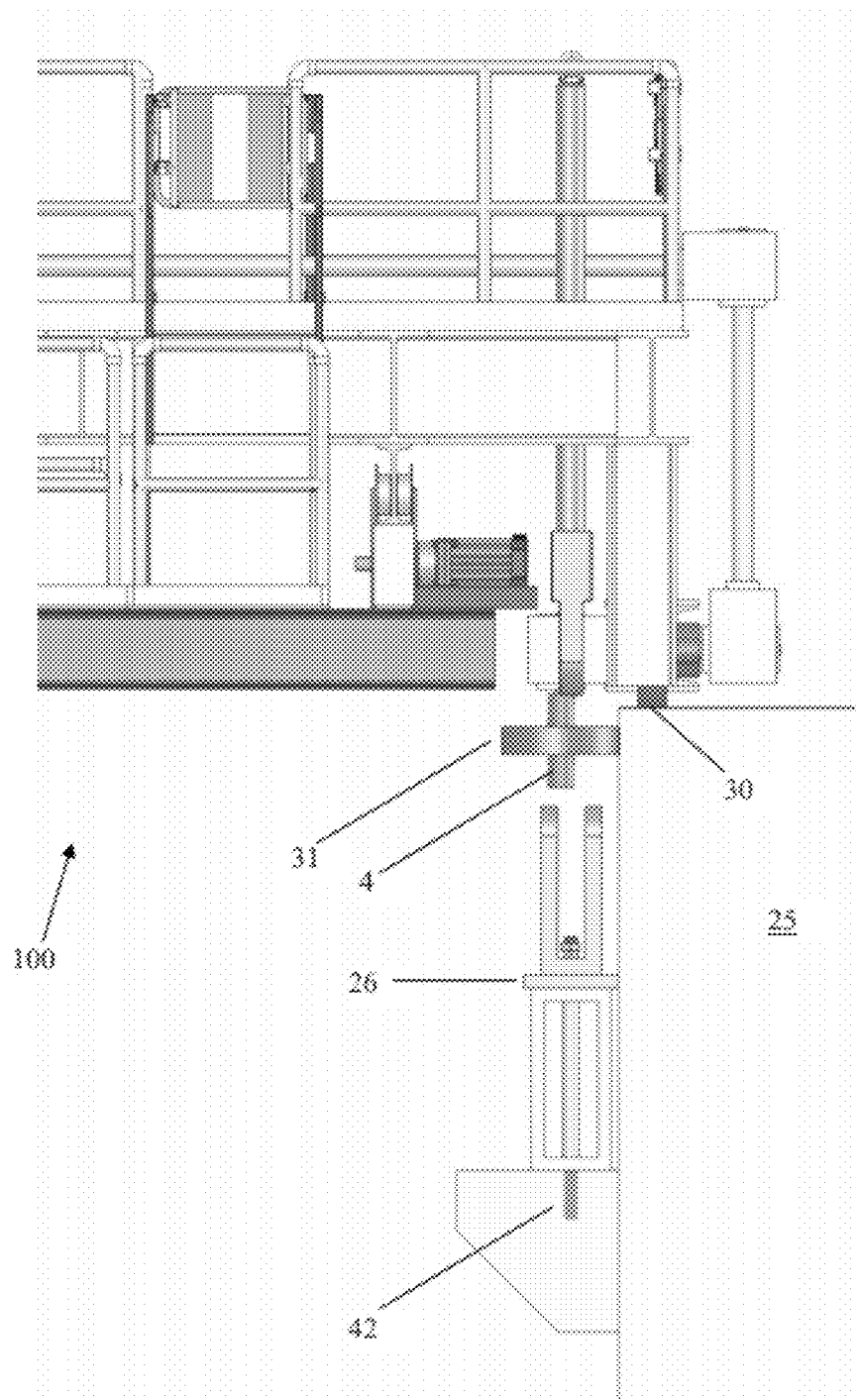
FIG. 45 shows the IRMSCA of FIG. 40 disengaged from its support brackets.

FIGS. 44-45 show the wheeled IRMSCA 100 in refueling configuration. FIG. 44 shows a view similar to that of FIG. 43, but clevises 4 retracted from the support brackets 26. FIG. 45 shows a detailed view similar to that of FIG. 6. It is seen that the IRMSCA 100 is free to roll atop the D-ring 25 along its wheels 30.

For ease of description, the IRMSCA 100 may be described herein as rolling on the D-ring rails 24. However, it should be understood that such discussion includes the wheeled mode wherein the IRMSCA 100 rolls atop the D-ring wall 25 itself with no rails 24 present.

Figure 7:
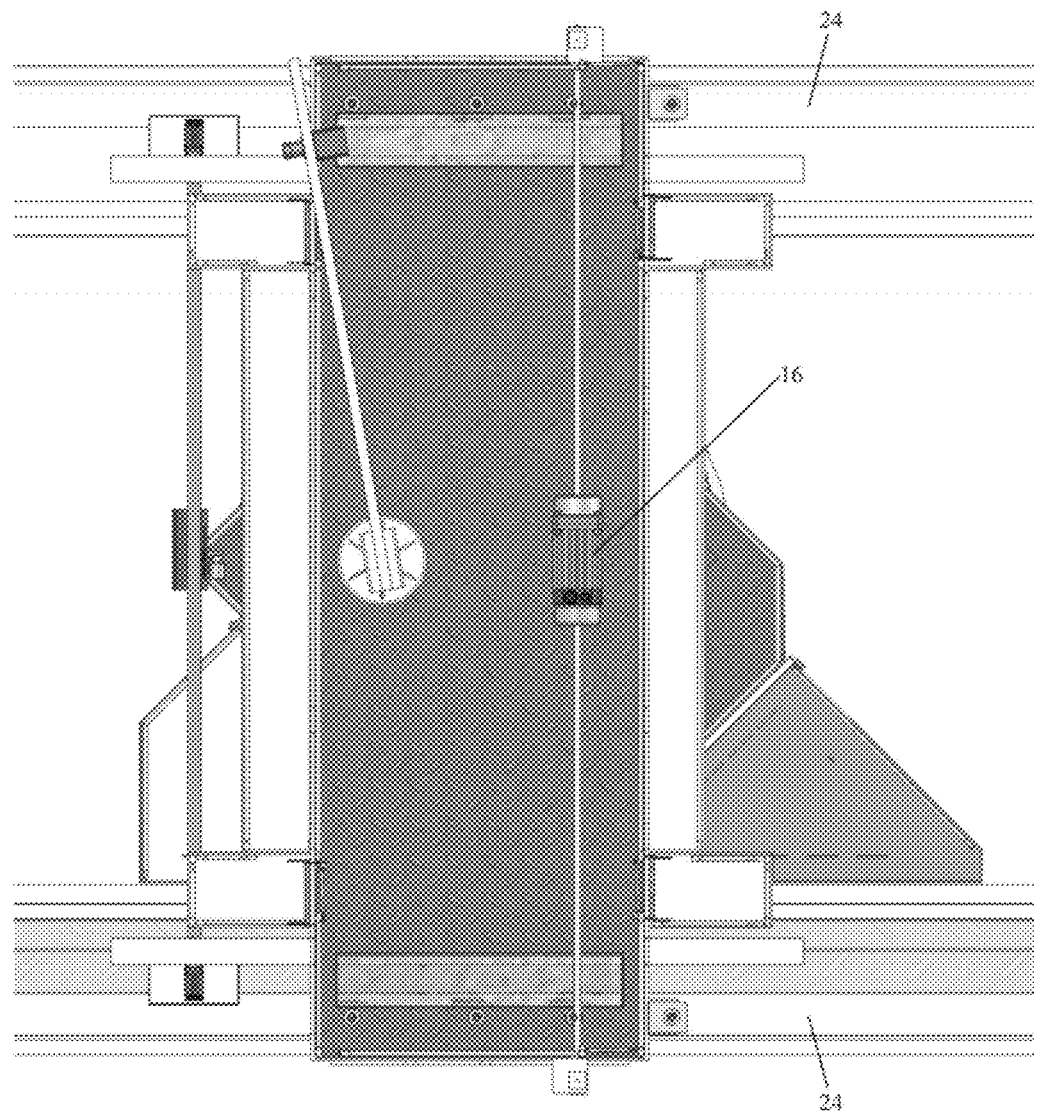
FIG. 7 shows a plan view (operating plant configuration - hoist north) of the IRMSCA of FIG. 1.
Figure 8:
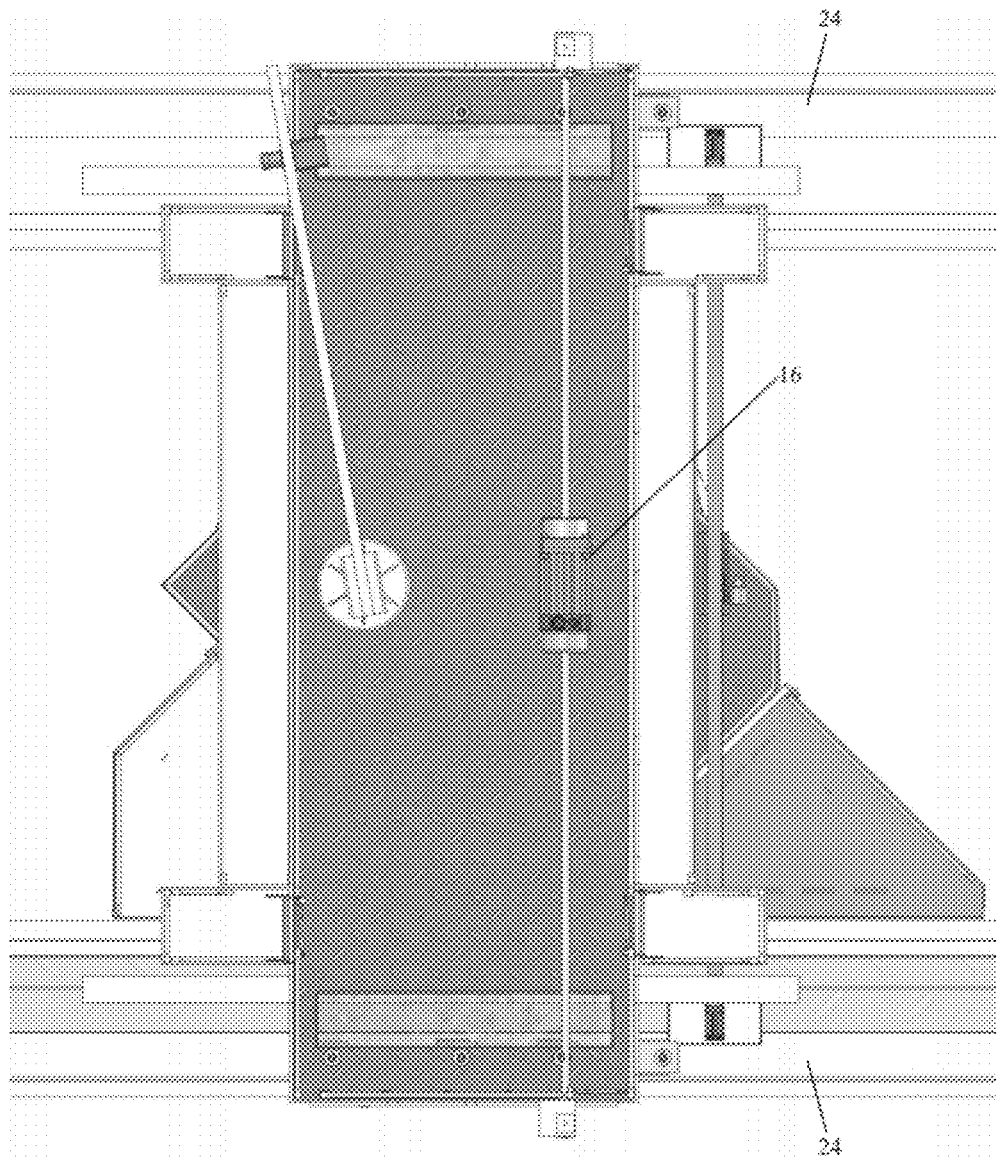
FIG. 8 shows a plan view (operating plant configuration - hoist south) of the IRMSCA of FIG. 1.

FIGS. 7 and 8 show plan views of the IRMSCA 100. FIG. 7 shows the IRMSCA with the hoist 16 positioned in a first, north side of the containment building. In FIG. 8, the IRMSCA is shown with the hoist 16 positioned in a second, south side of the containment building. The hoist 16 can be repositioned by translation along the rails 24. FIG. 12 shows a bottom isometric view of the IRMSCA 100, including the hoist 16, hoist rail 14, rail extensions 15, and associated machinery to translate the hoist 16. FIG. 10 shows a suspension crane of the IRMSCA 100. At a minimum, the suspension crane and supporting IRMSCA 100 structure shall be load tested as an assembly at 300% of the 7.5 ton WLL.

Figure 9:
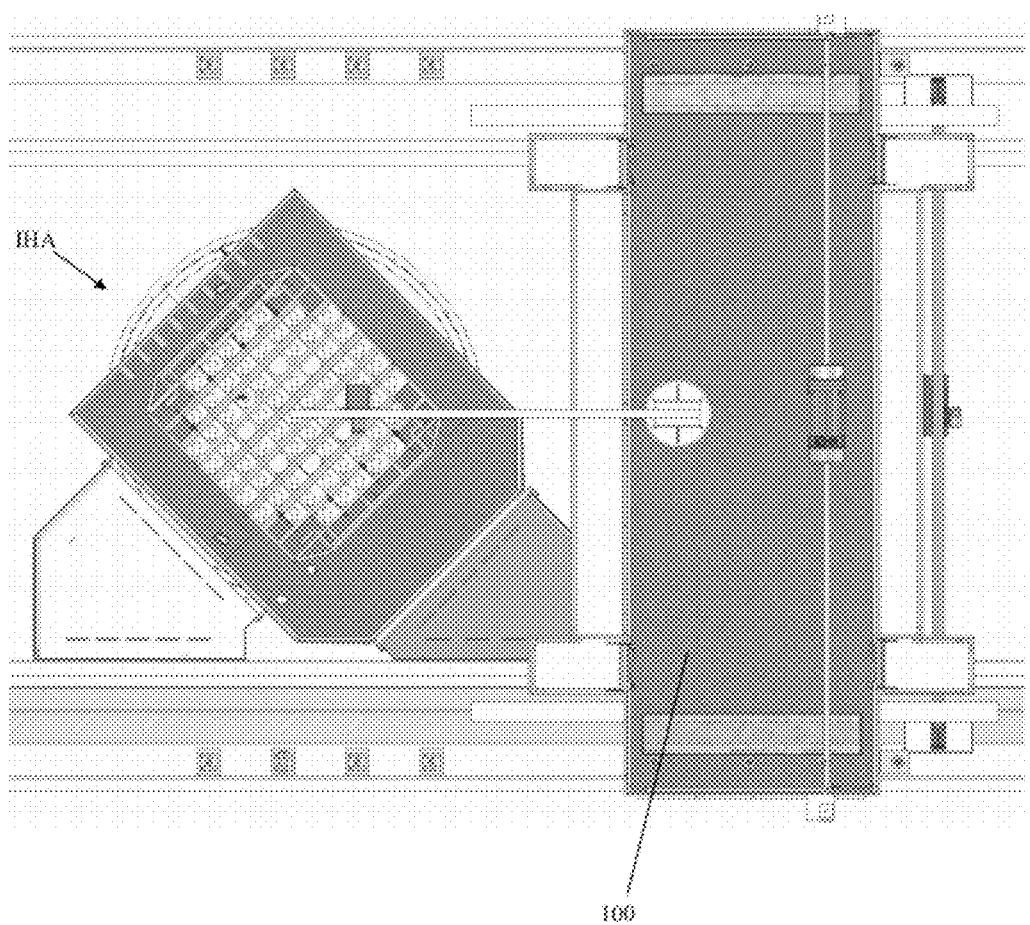
FIG. 9 shows a plan view (refueling configuration - hoist south) of the IRMSCA of FIG. 1.

FIG. 9 shows a plan view of the IRMSCA 100. Here, the IRMSCA 100 is in the refueling configuration with the hoist 16 positioned in the second, south location of FIG. 8. The IRMSCA 100 has been moved along the rails 24 atop of the D-Ring 25 and positioned so that it is offset from the reactor vessel. This allows the vessel head to be removed. The IRMSCA's integral crane rail extensions 15 and crane 16 expands its benefits; it can be used for equipment transfer to and from the refuel cavity, fuel transfer, tube blank flange installation and removal, internal indexing fixture (IIF) installation and removal from the reactor vessel, any CRDM component (for example, lead screw, stator, and motor tube) handling, and other reactor services activities.

Figure 13:
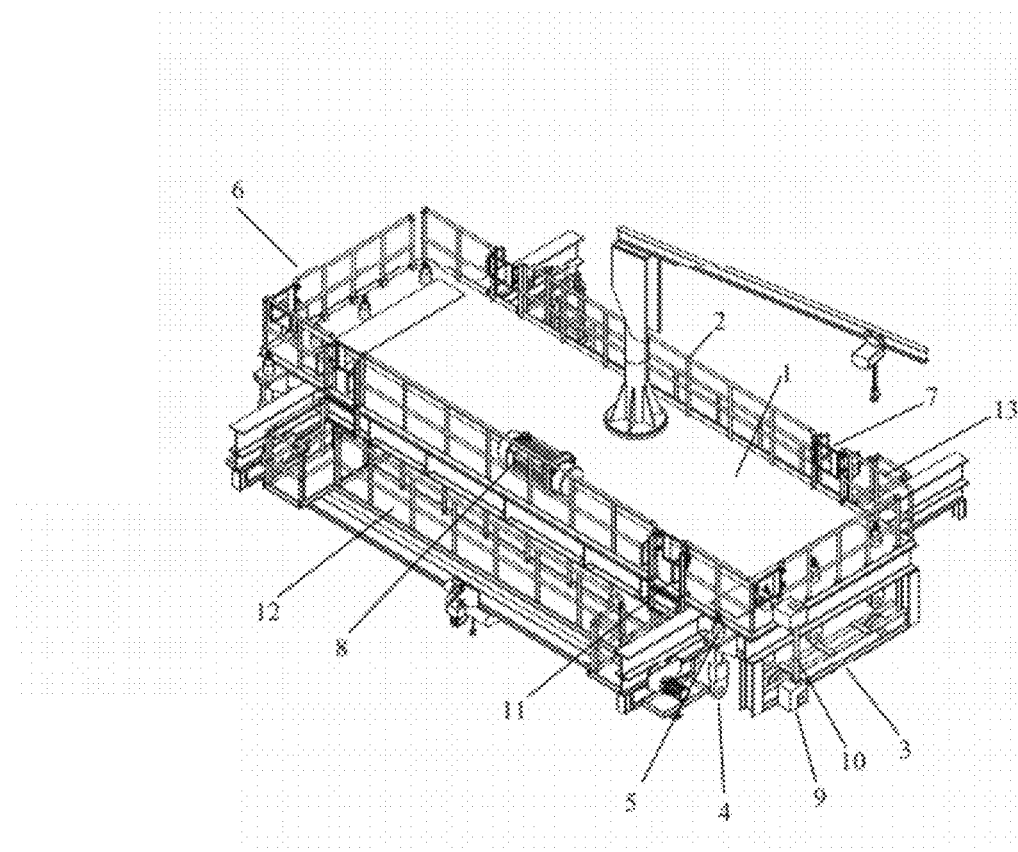
FIG. 13 shows a rolling missile shield assembly.

FIG. 13 shows a preferred rolling missile shield assembly 20 for the IRMSCA 100 of the present invention. The IRMSCA 100 contains a number of components and/or subassemblies, including: a missile shield support frame assembly 1, a plurality of long missile shield handrail assemblies 2, a plurality of movable drive frame assemblies 3, a plurality of missile shield support clevis assemblies 4, a plurality of missile shield support nuts 5, a plurality of side missile shield handrail assemblies 6, a plurality of safety gates 7, a motor 8, a plurality of gear boxes 9, a gear shaft 10, a plurality of missile shield lower ladder assemblies 11, a hoist rail access catwalk assembly 12, and a plurality of short missile shield handrail assemblies 13.

Figure 15:
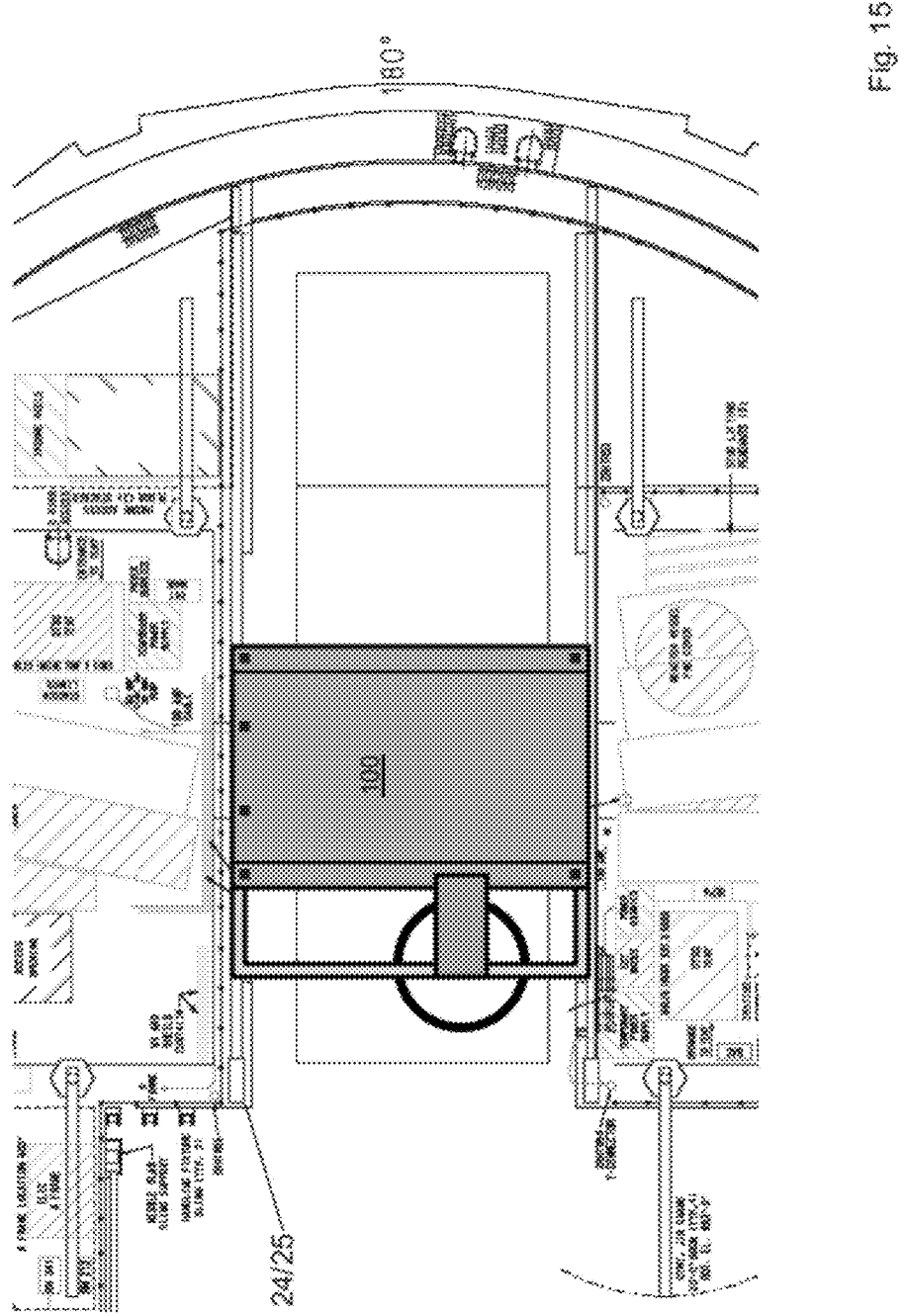
FIGS. 15 through 39 illustrate exemplary operations that can be achieved using the IRMSCA of FIG. 1.
Figure 16:
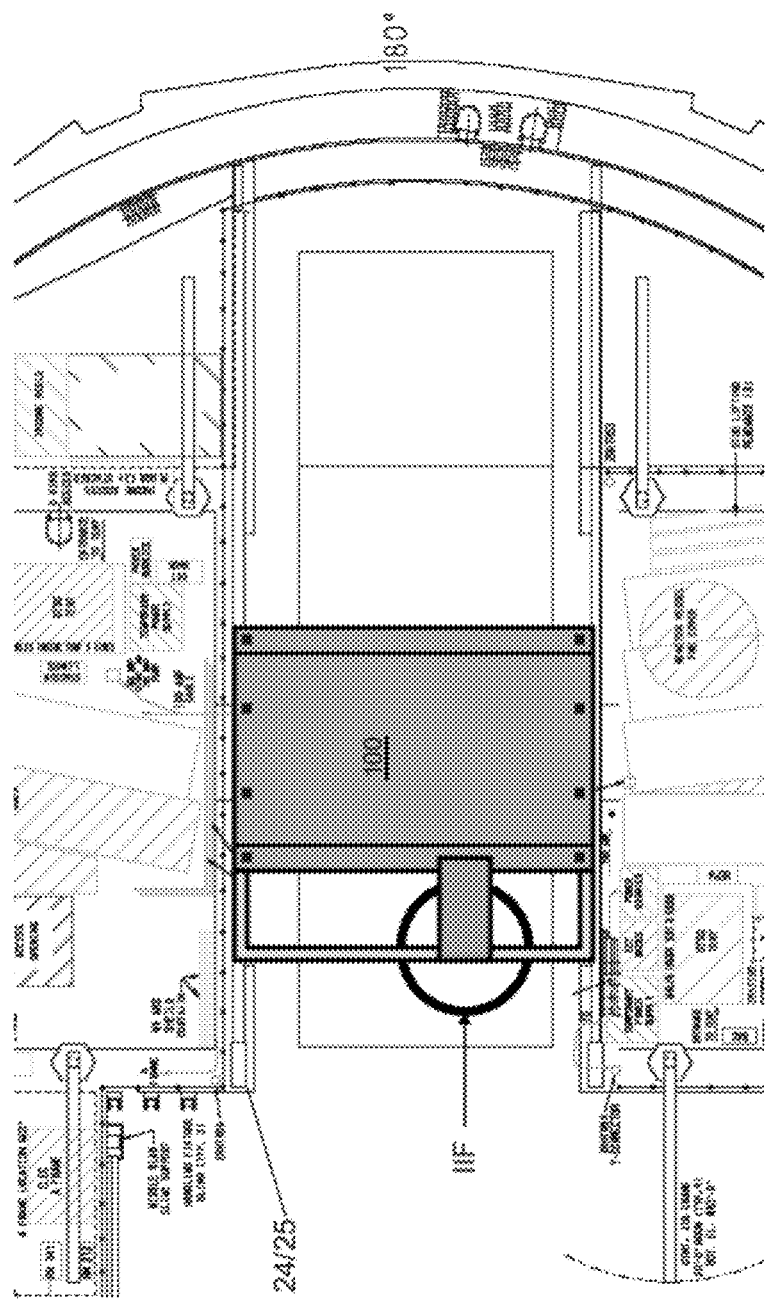

FIGS. 15 through 39 illustrate exemplary operations that can be achieved using the IRMSCA 100. These figures show the IRMSCA 100 in an exemplary nuclear power plant. These figures are shown in the perspective of looking down at the plant equipment from above, at the D-ring 25 location. In FIGS. 15 and 16, the IRMSCA 100 is positioned above the IHA. This is the fixed position of the IRMSCA 100, in which the missile shield 20 is in its operational position. The hoist 16 is positioned in the first, north side of the containment building as in FIG. 7.

Figure 17:
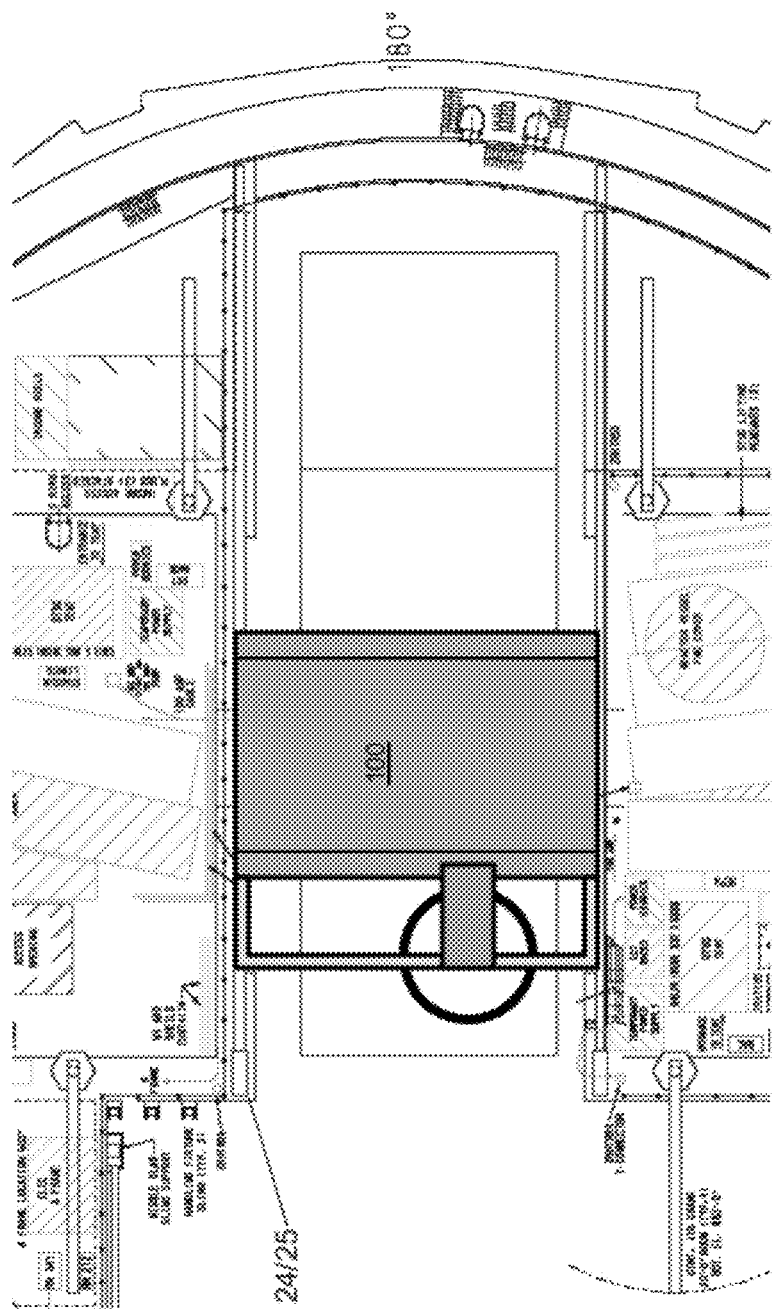

In FIG. 17, the IRMSCA 100 is being used to remove hardware that retains the IHA and/or other equipment in place during plant operation.

Figure 18:
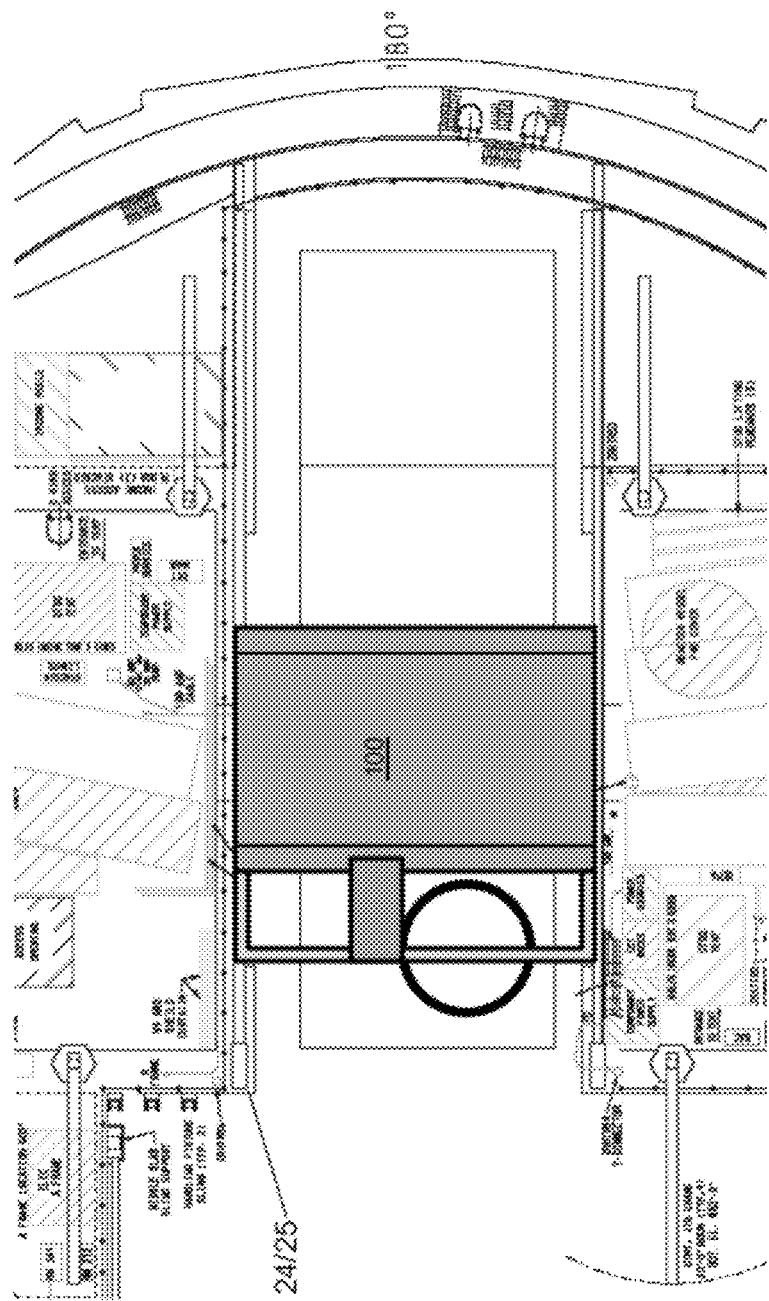
Figure 19:
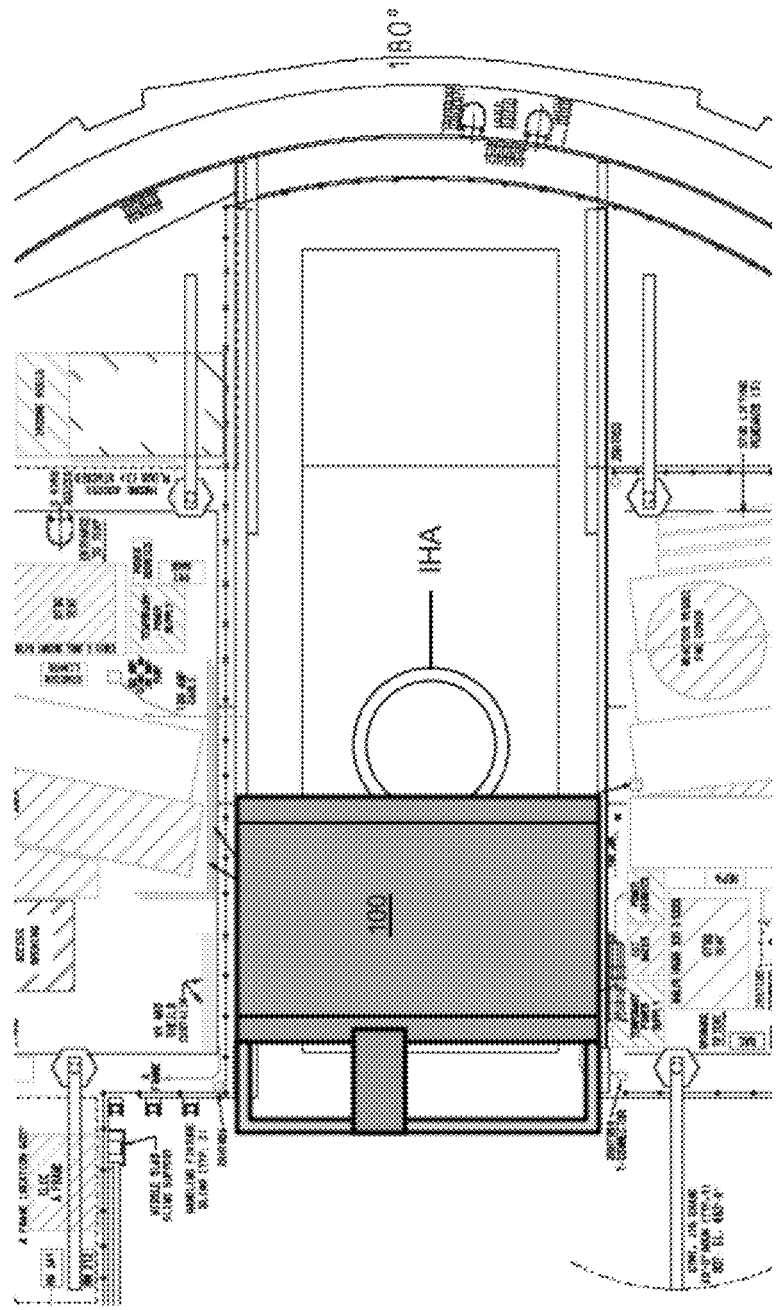
Figure 20:
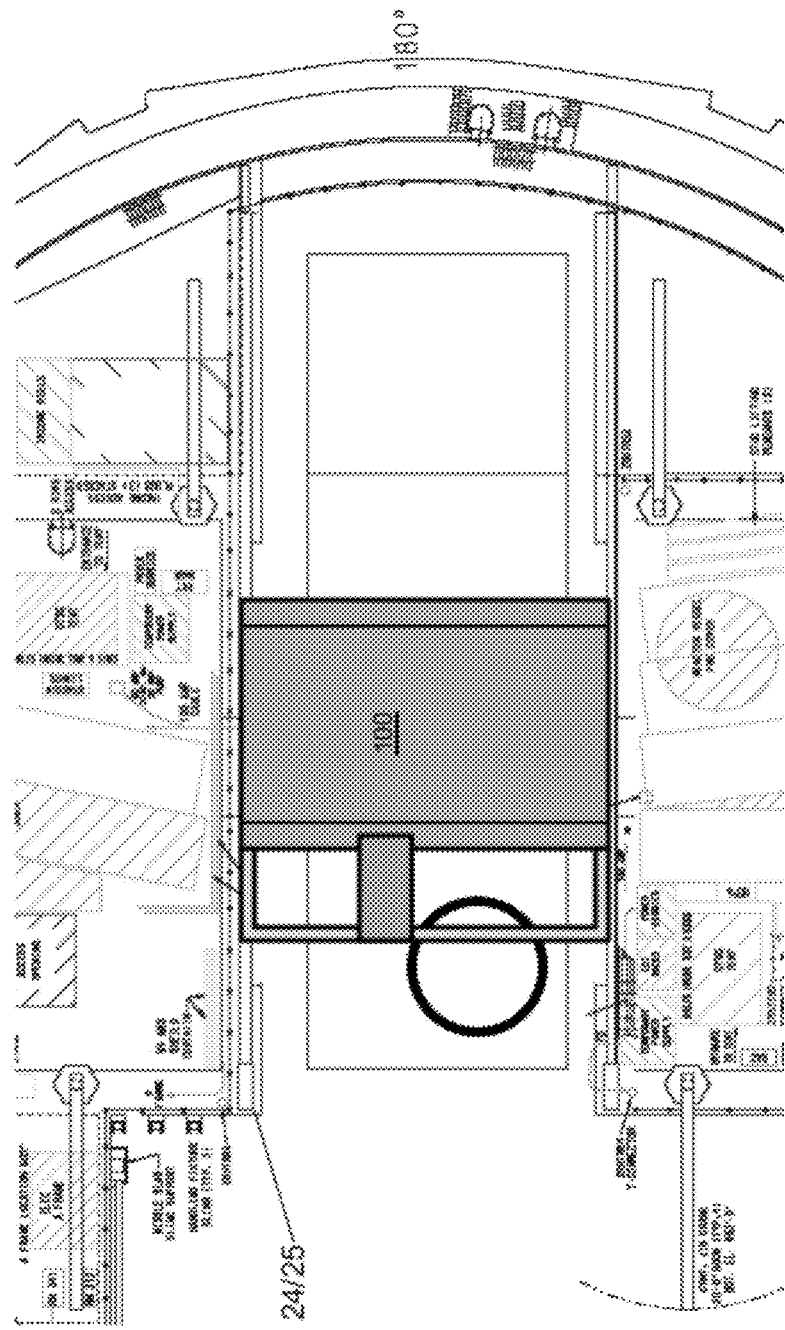

In FIGS. 18-20, the IRMSCA 100 is being used to move equipment to and from the reactor cavity. Movement of the hoist 16 can be accomplished by moving the entire IRMSCA 100 along the D-ring rails 24 or building support surface, by retaining the IRMSCA in place and moving the hoist rail 14 along the transverse rails 15, or by a combination thereof. The hoist 16 is then used to lower a hook or other coupling device in known manner to the equipment to be moved. The equipment is secured to the coupling device, and the hoist 16 is used to lift the equipment to the desired location, where it is lowered and disconnected from the coupling device. In FIGS. 18 and 20, the hoist 16 is positioned over the reactor cavity. FIG. 19 illustrates the position of the IRMSCA 100 intermediate the steps illustrated in FIGS. 18 and 20. Here, the IRMSCA 100 has been translated toward the left side of the page (the north side of the exemplary power plant) along the building support surface, and the IHA is visible.

Figure 21:
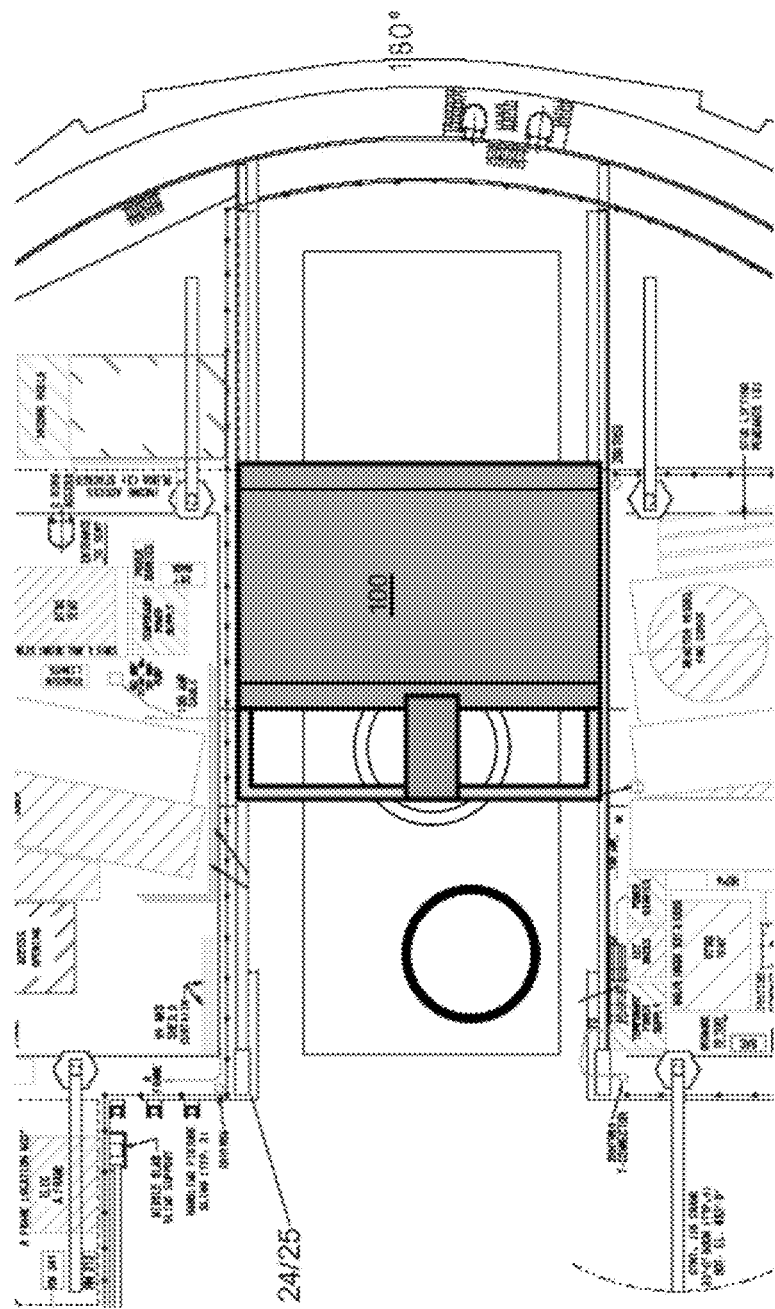

In FIG. 21, the CRDM lead screws have been raised, lifted by the hoist 16 as a prerequisite to IHA removal and storage during the RFO.

Figure 22:
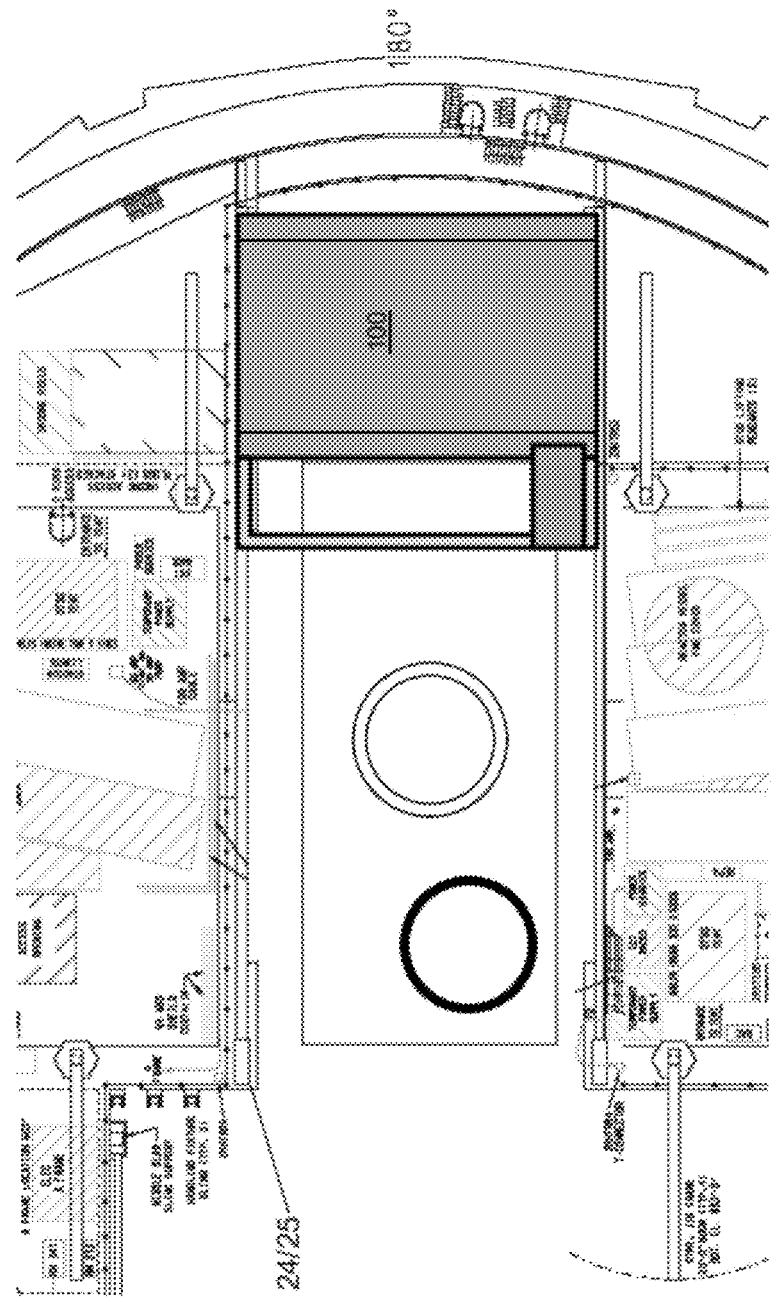

FIG. 22 shows the IRMSCA 100 at the southernmost location in the exemplary plant, adjacent the end of the building support surface rails 24/25. In this position, the IRMSCA 100 is out of the way so that the polar crane can be used to lift the IHA and move it to a suitable storage position.

Figure 23:
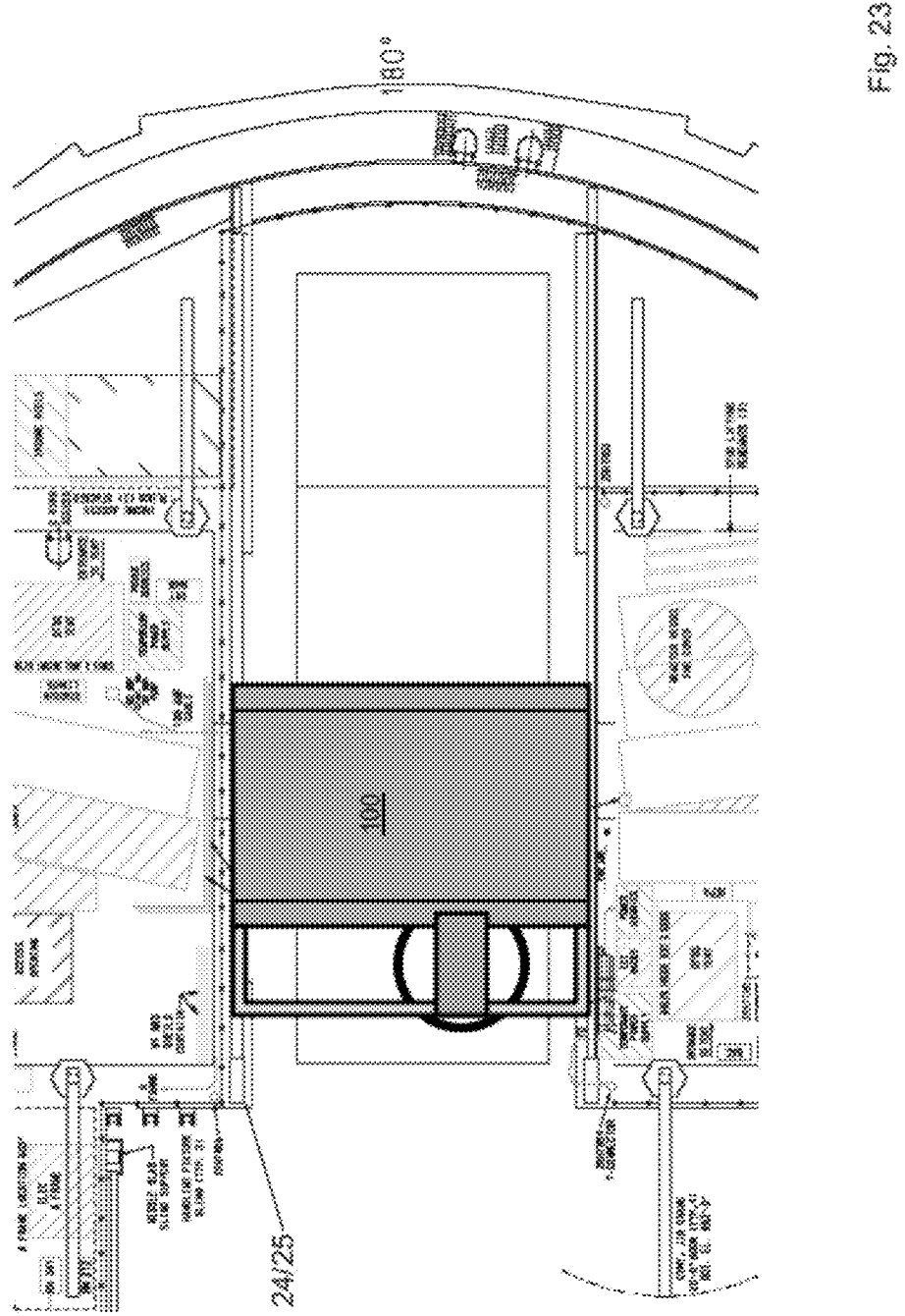
Figure 24:
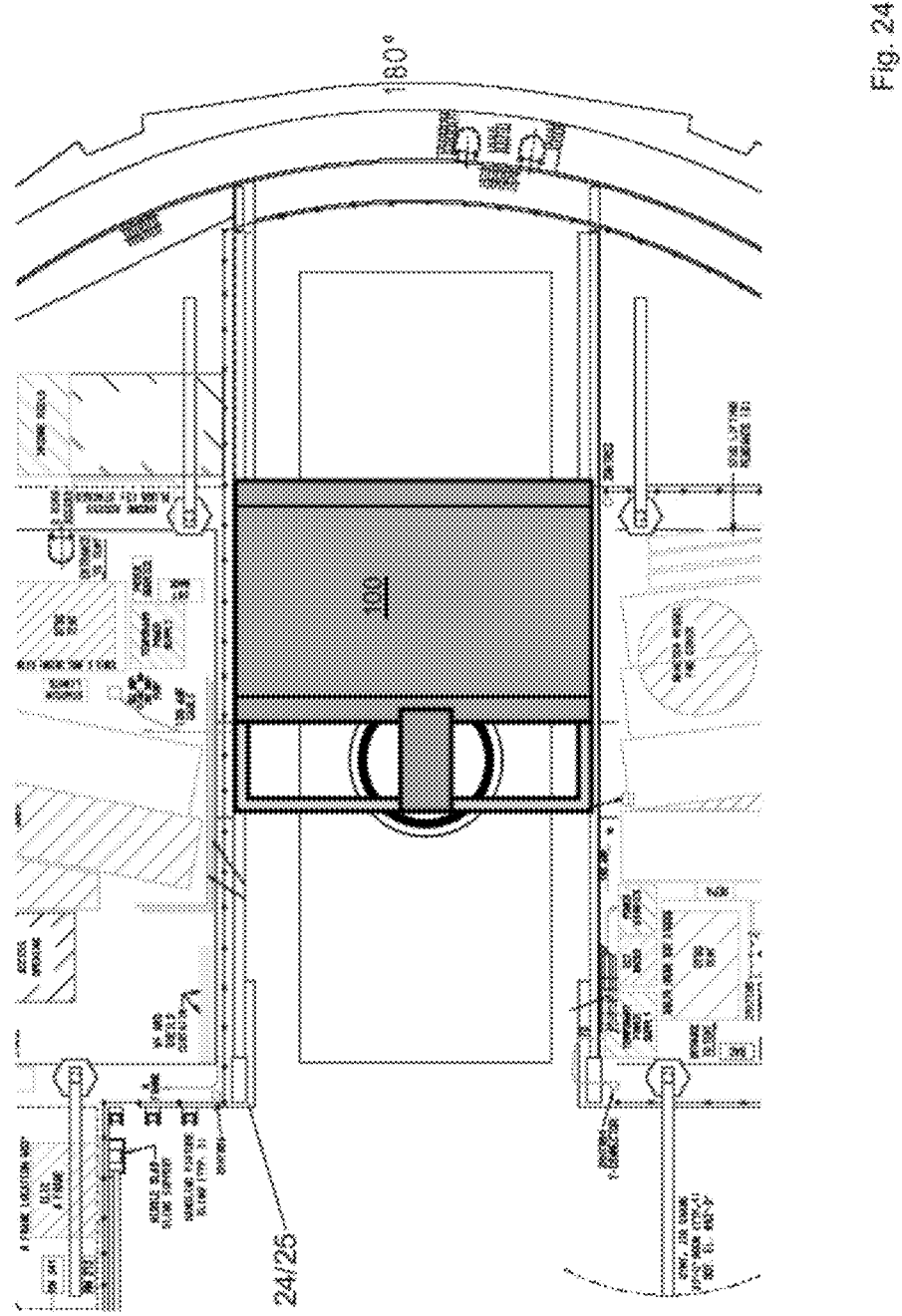
Figure 25:
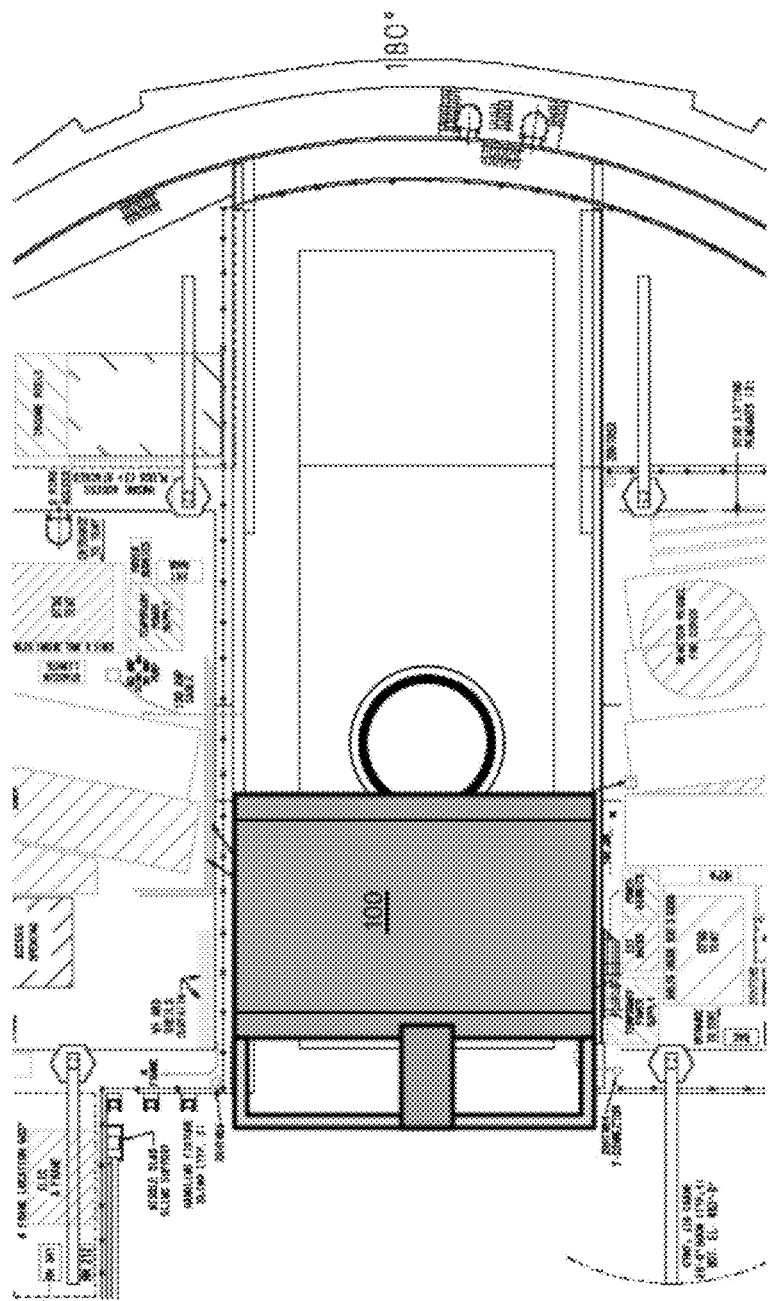
Figure 26:
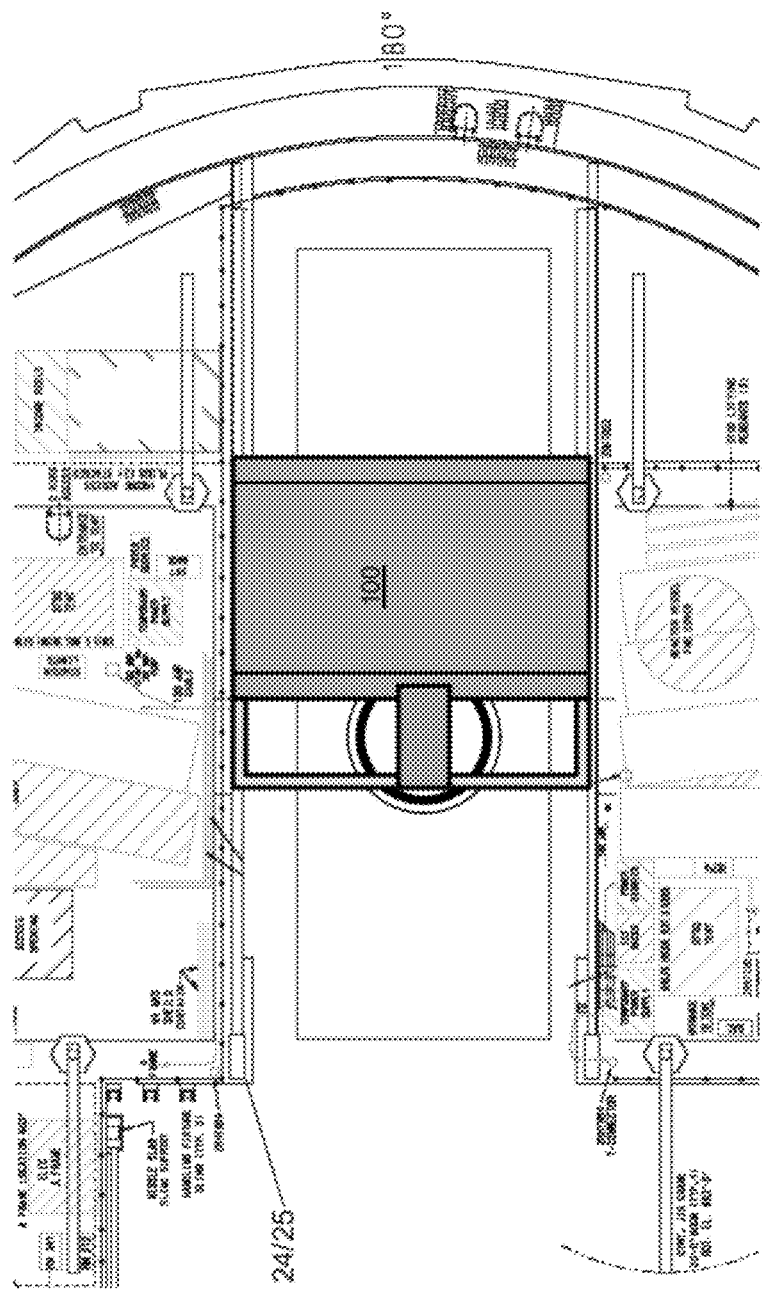
Figure 27:
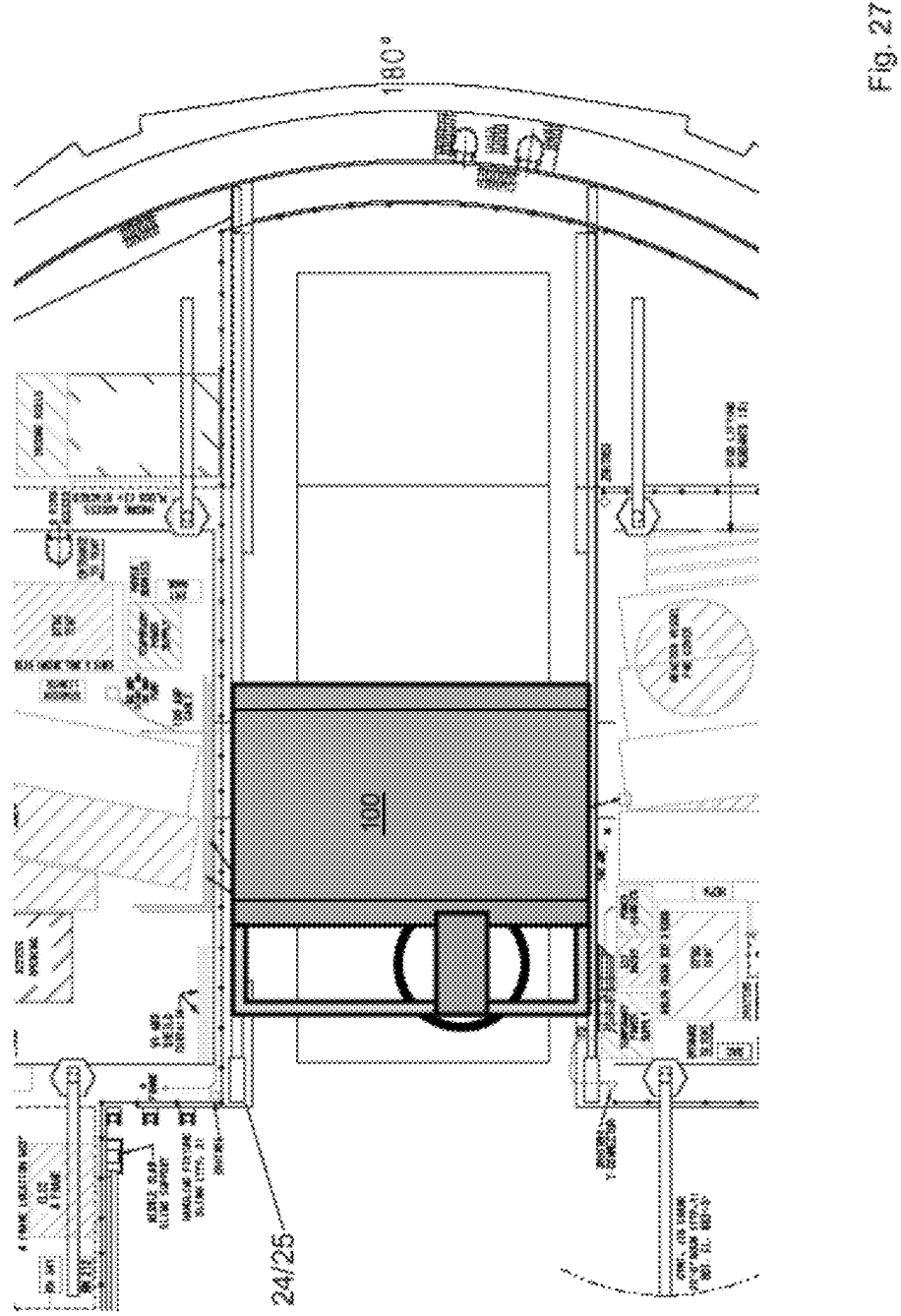
Figure 28:
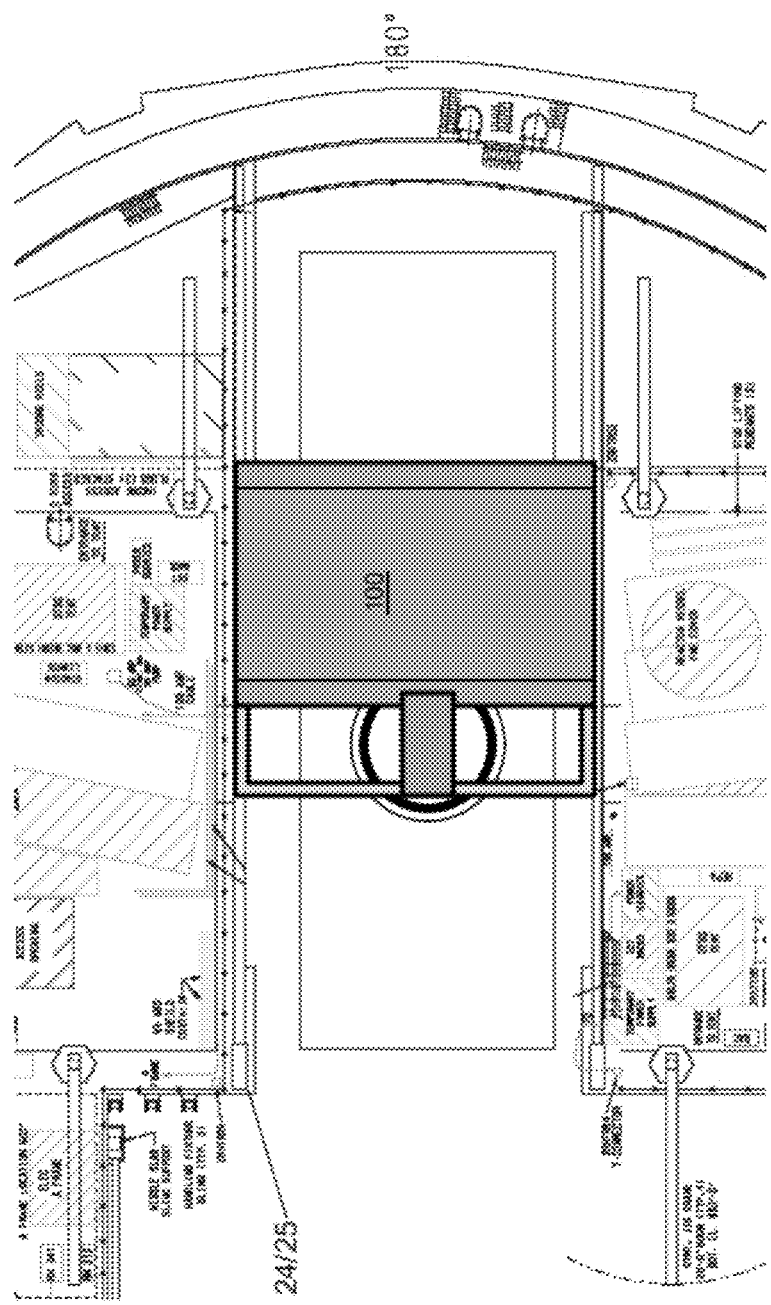
Figure 29:
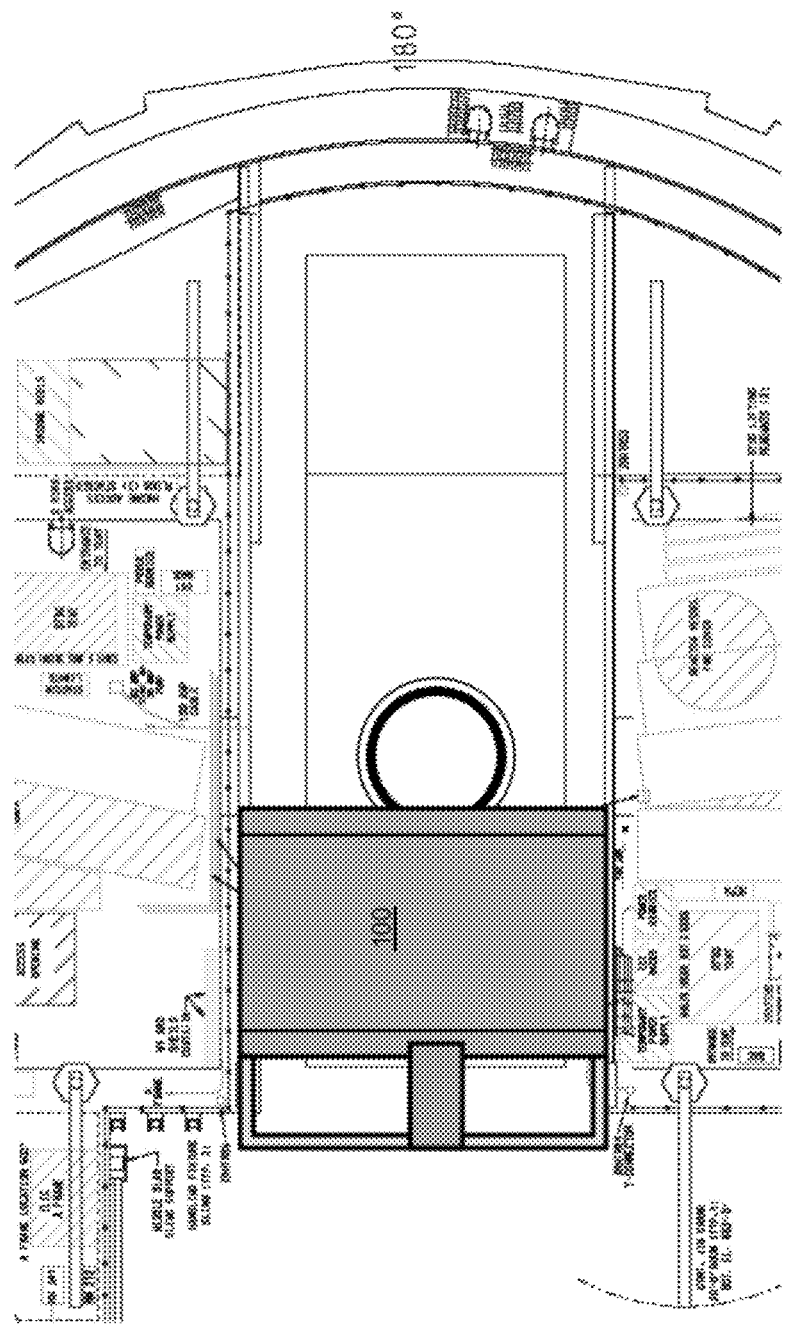
Figure 30:
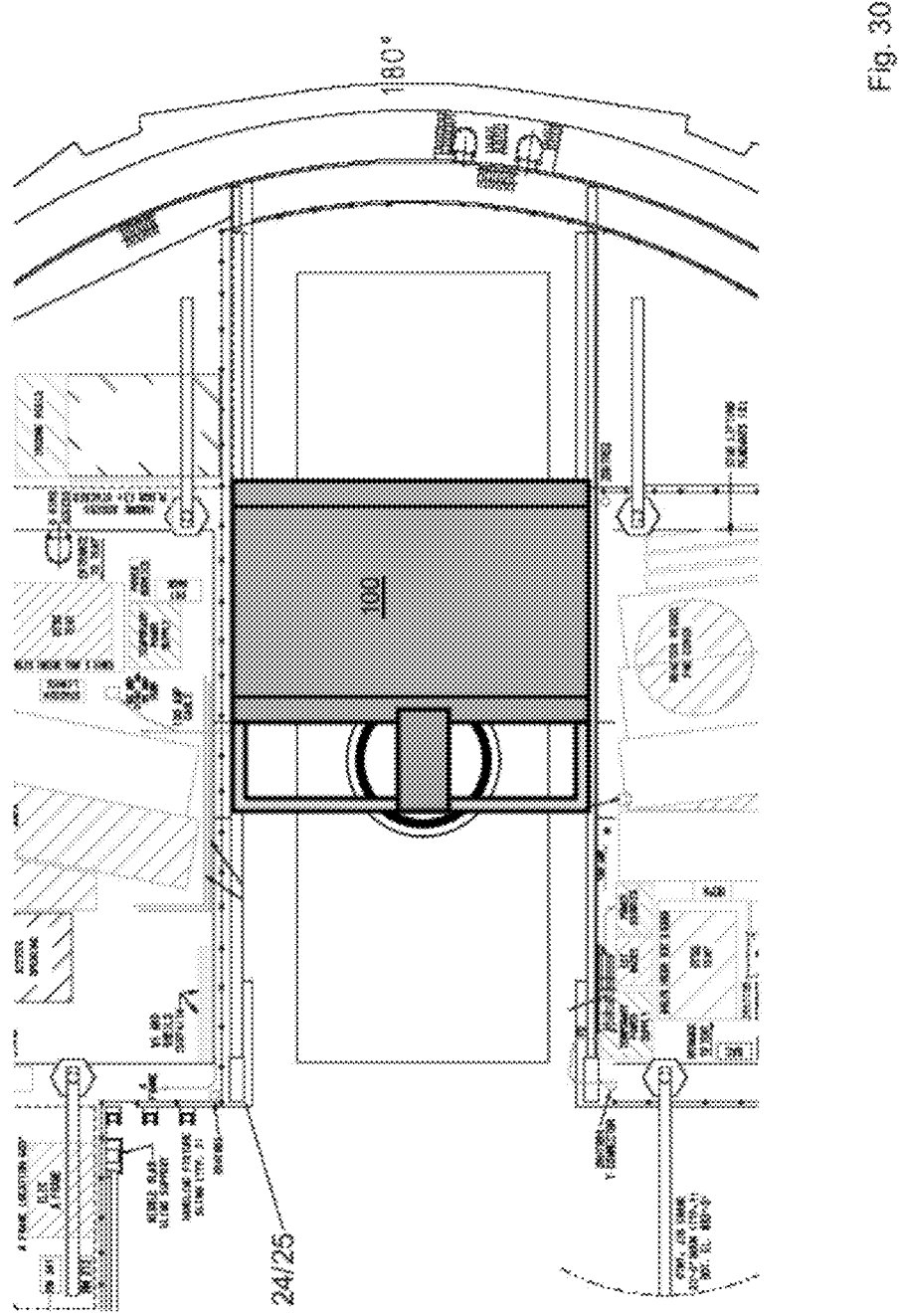
Figure 31:
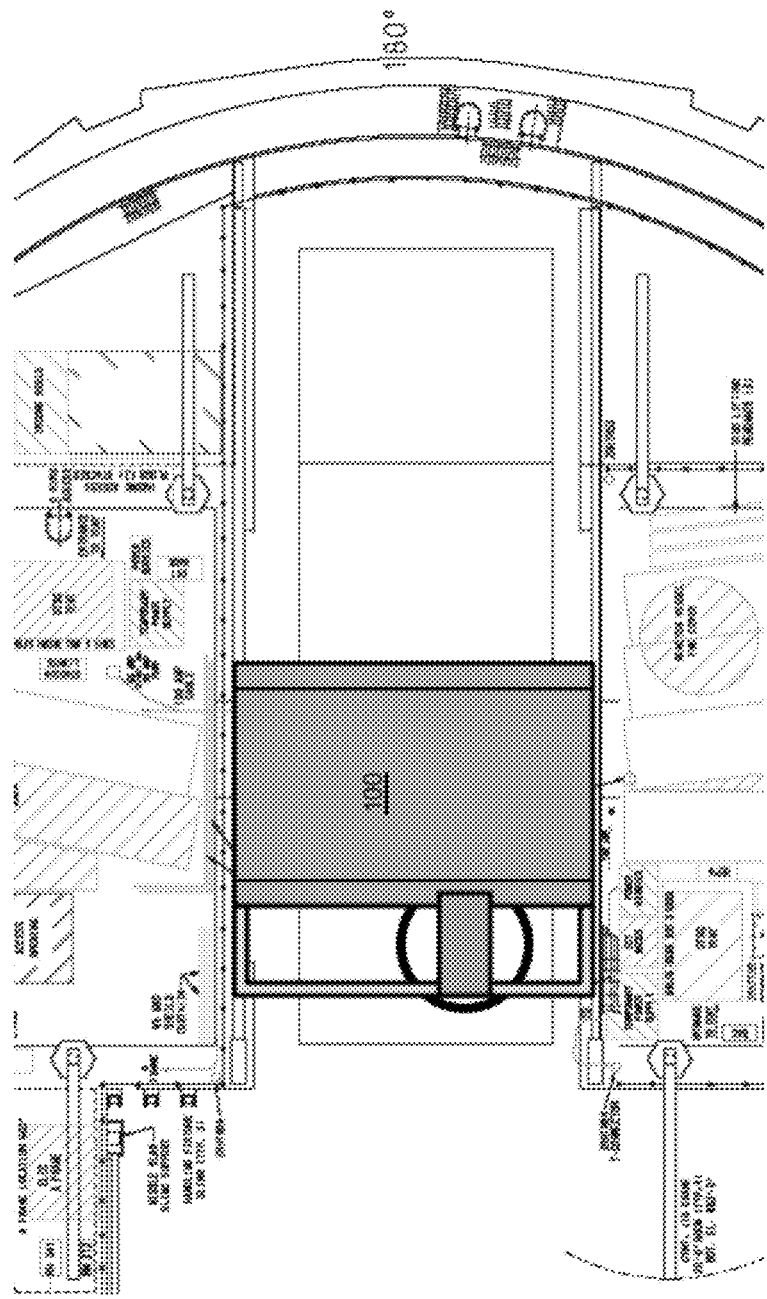

FIGS. 23-31 show the IRMSCA 100 as used to work with the IIF. In FIG. 23, the IRMSCA 100 is positioned with the hoist above the IIF. The hoist 16 is used to lift the IIF, and the IRMSCA 100 moves the IIF for installation to the reactor vessel flange, as shown in FIG. 24. FIG. 25 shows the IRMSCA 100 towards the north end of the exemplary power plant, allowing the polar crane to access and move the core support assembly and plenum from the reactor vessel to their storage location. In FIG. 26, the IRMSCA 100 is in position to remove the IIF from the reactor vessel and move it to its storage position, as shown in FIG. 27. Fuel rods can now be transferred to and from the reactor vessel. After the fuel transfer is complete, the IRMSCA 100 reinstalls the IIF on the vessel flange, as shown in FIG. 28. In FIG. 29, similar to FIG. 25, the IRMSCA 100 is positioned towards the north end of the exemplary power plant so the plenum can be repositioned. Finally, in FIGS. 30 and 31, the IIF is removed from the vessel flange and positioned in its storage location.

Figure 32:
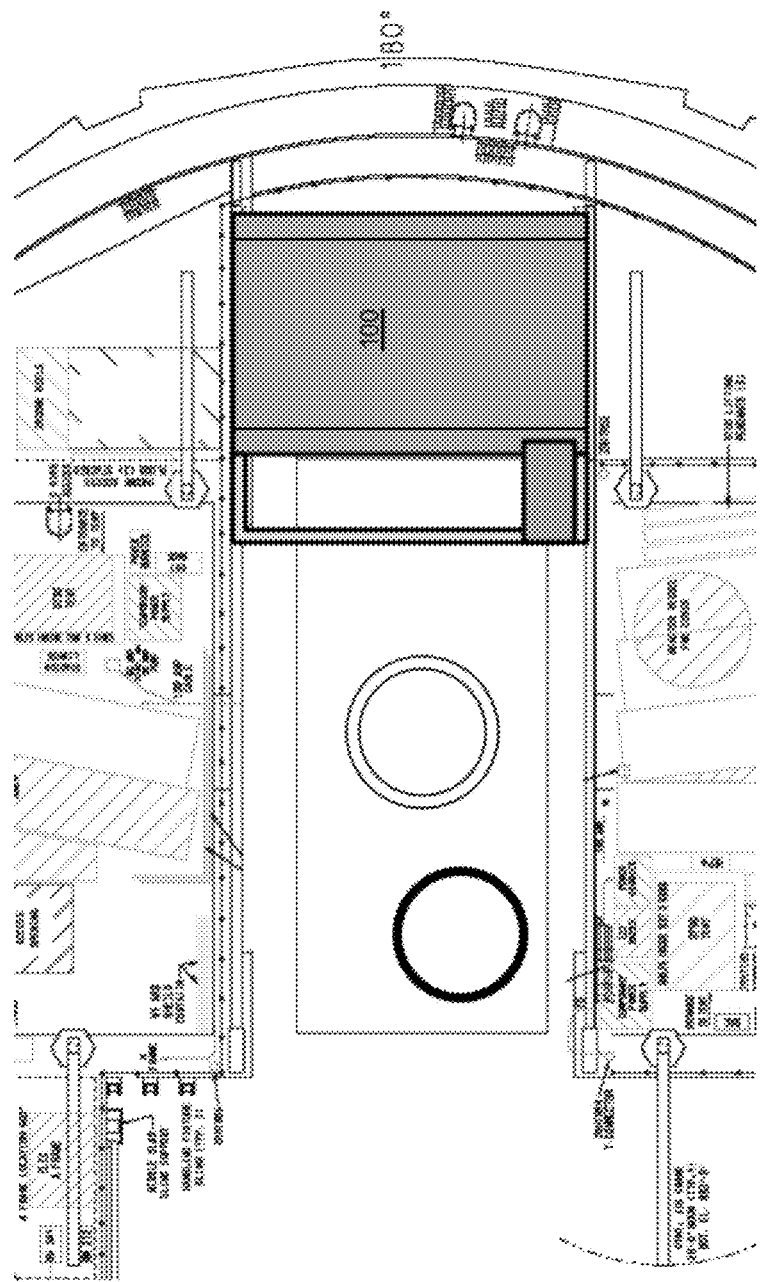

FIG. 32, similar to FIG. 22, the IRMSCA 100 is in its southernmost location in the exemplary plant, adjacent the end of the building support surface rails 24/25. In this position, the IRMSCA 100 is out of the way so that the IHA can be repositioned on the reactor vessel.

Figure 33:
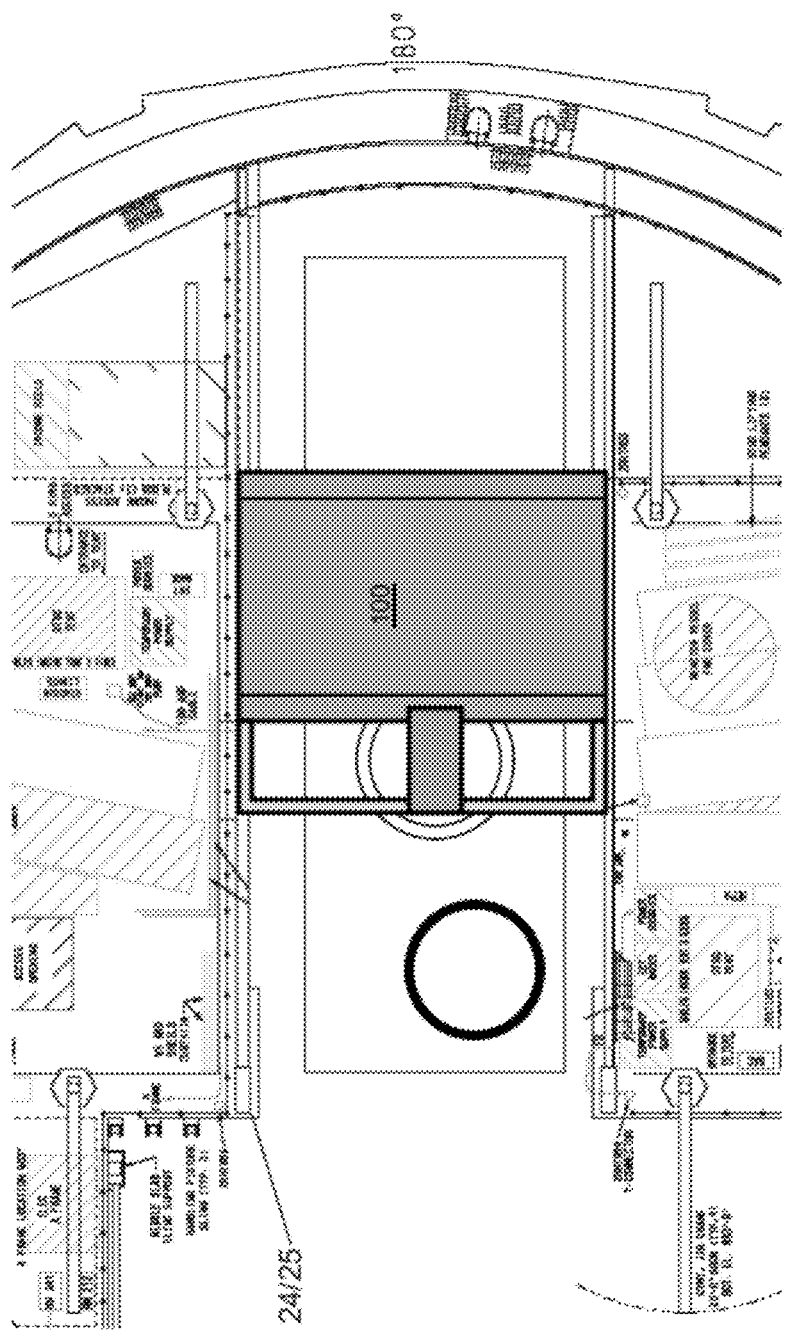
Figure 34:
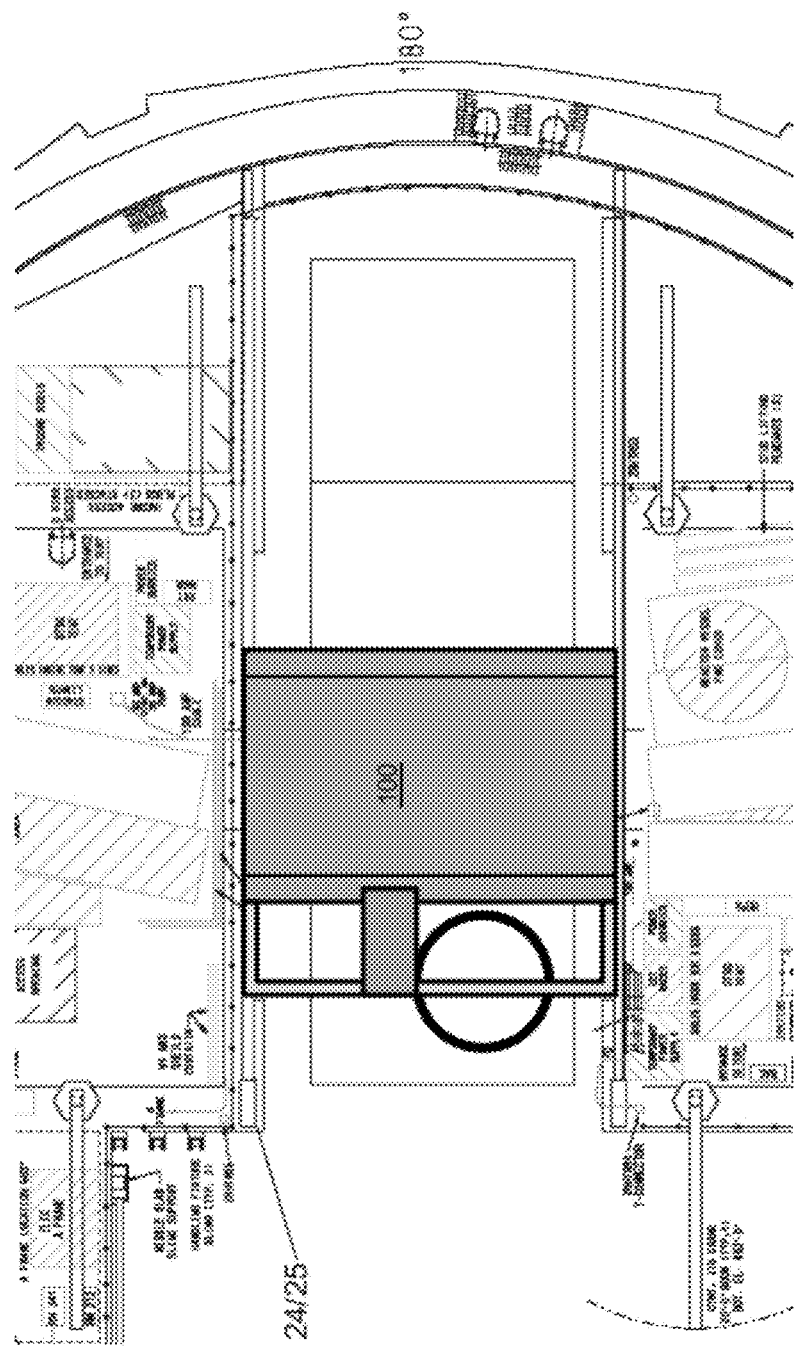
Figure 35:
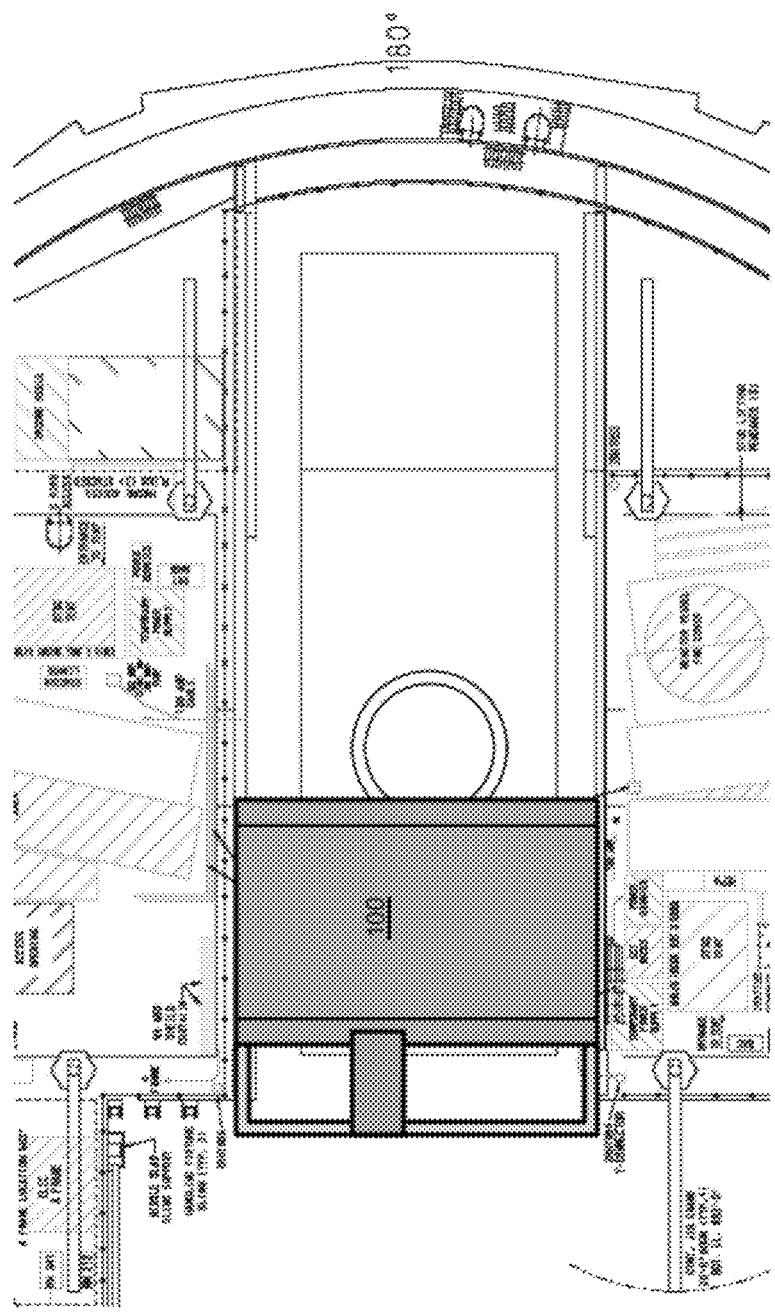
Figure 36:
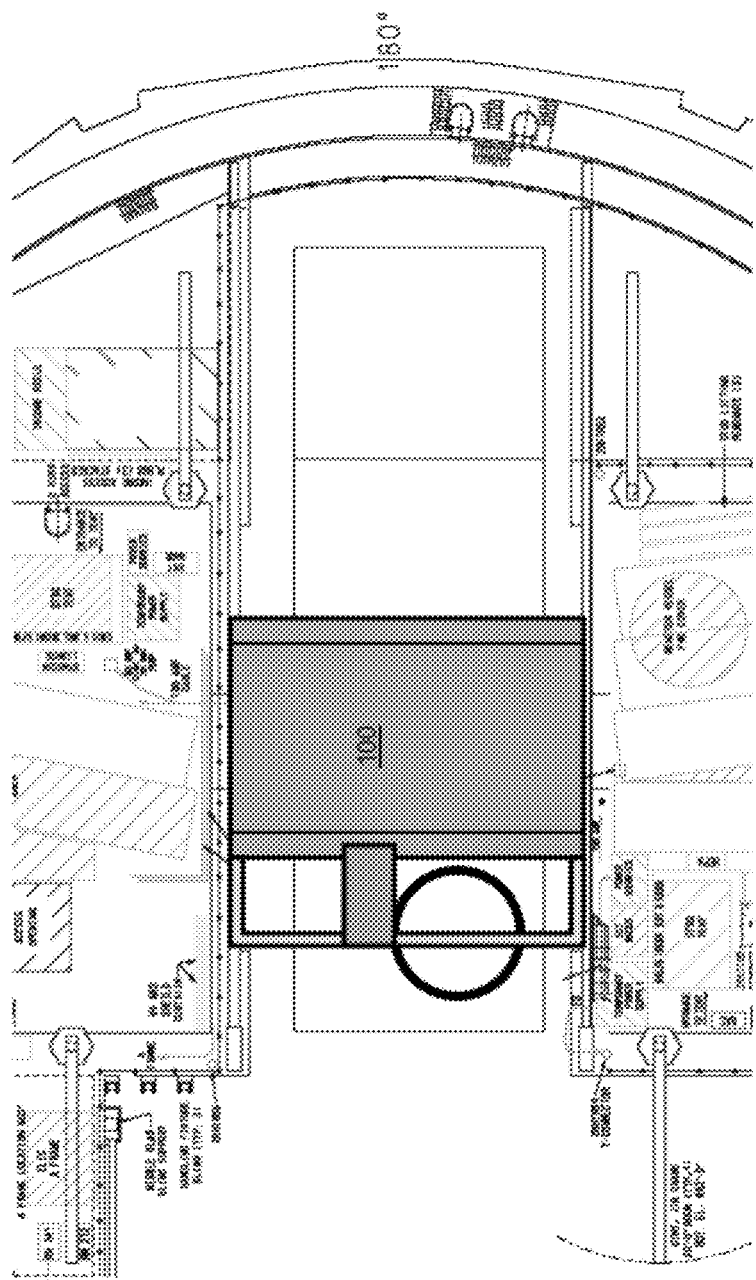
Figure 37:
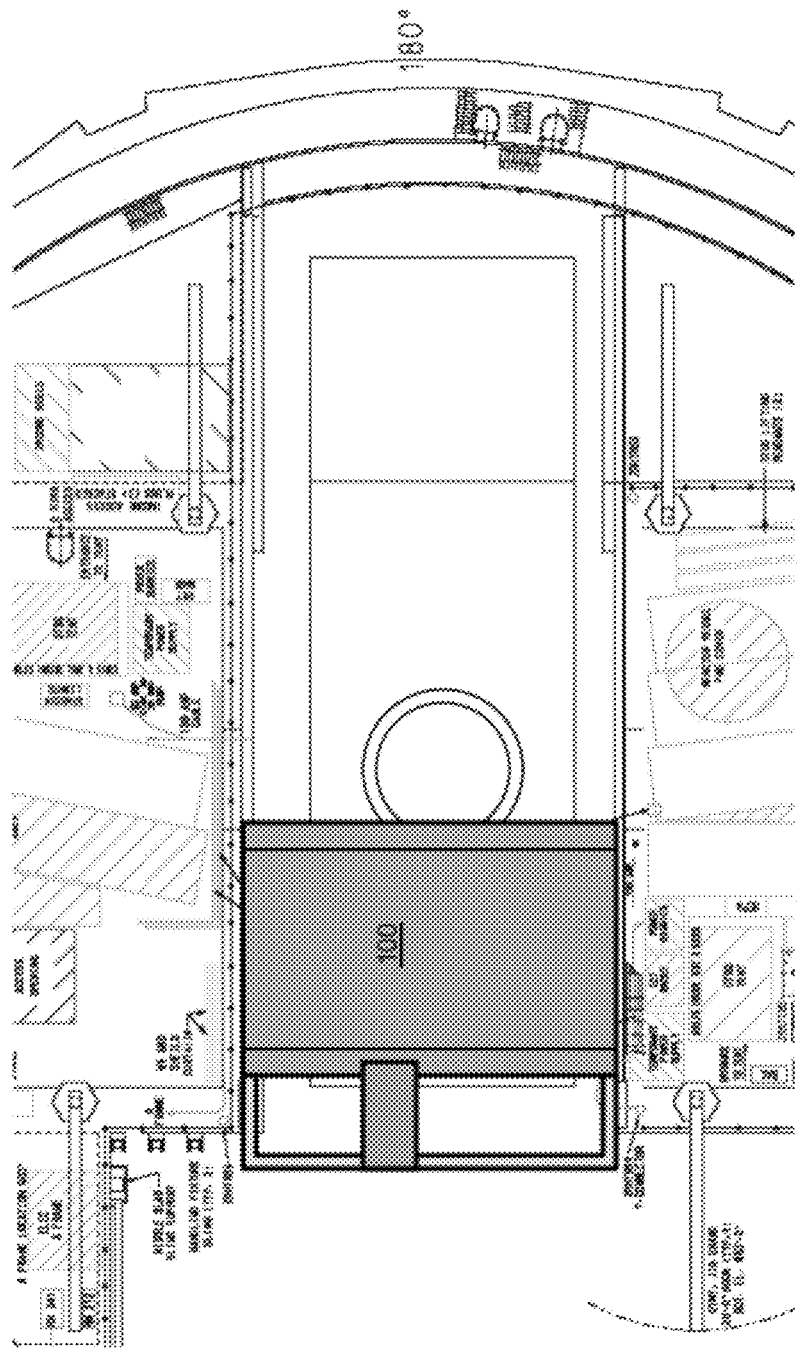

In FIG. 33, the CRDM lead screws are lowered from their parked position in the IHA.

In FIGS. 34-37, the IRMSCA 100 is being used to move equipment to and from the reactor cavity similarly as done in FIGS. 18-20.

Figure 38:
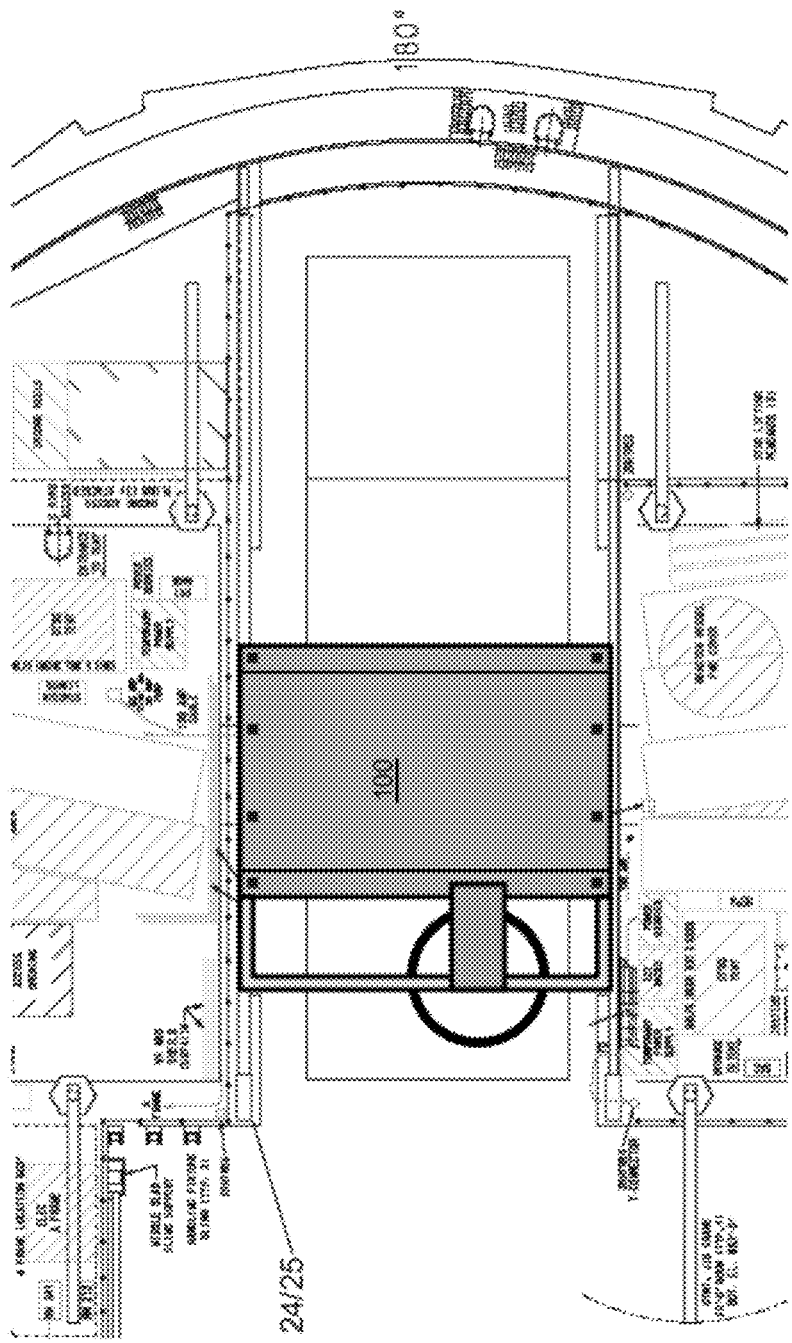
Figure 39:
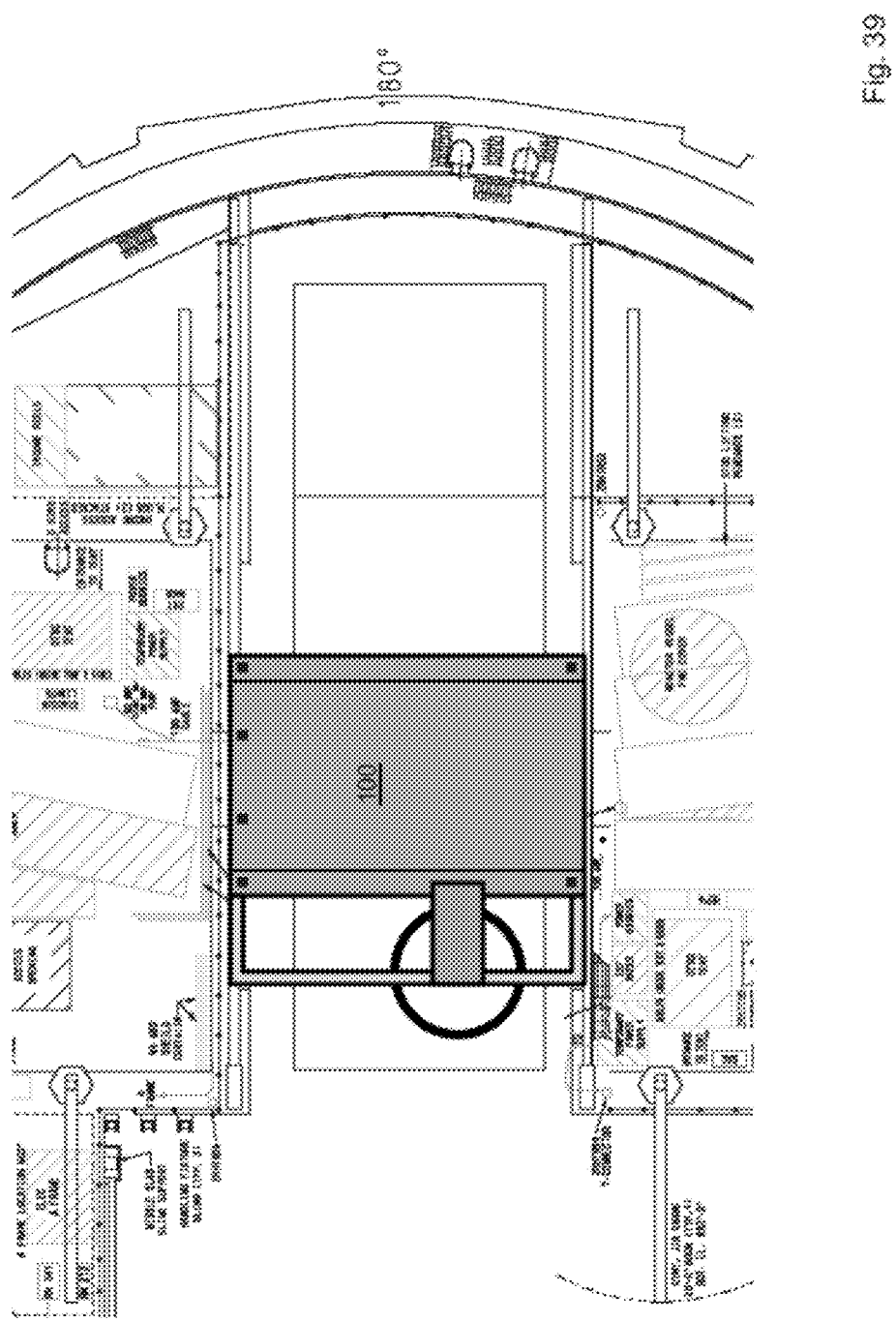

Finally, in FIG. 38 the IRMSCA 100 is used to reinstall hardware that retains the IHA and/or other equipment in place during plant operation, and in FIG. 39 the IRMSCA 100 is positioned above the IHA. This is the fixed position of the IRMSCA 100, in which the missile shield 20 is in its operational position. The hoist is positioned in the first, north side of the containment building away from the IHA so that it is not between the IHA and the missile shield.

The reactor building polar crane is typically used in many RFO operations. Such operations frequently are delayed due to the reactor building polar crane being used for other tasks. Thus, the use of the hoist 16 of the IRMSCA 100 of the present invention to perform the functions discussed above, in lieu of the reactor building polar crane, frees the polar crane to be used in other RFO operations. The time saved increases efficiency and could reduce the overall duration of the RFO, allowing the plant to be brought back on-line more quickly, which reduces the monetary costs associated with such outages.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A missile shield assembly for use in a building having a building support surface, comprising:
    a support frame;
    a missile shield coupled to said support frame;
    a roller coupled to said support frame and positioned to cooperatively engage the building support surface; and
    a clevis coupled to said support frame, said clevis configurable between an engaged position in which the missile shield assembly is retained in place and a disengaged position in which the missile shield assembly is moveable relative the building support surface.

2. The missile shield assembly of claim 1, further comprising a bracket configured to operationally engage said clevis in said engaged position.

3. The missile shield assembly of claim 2, wherein:
    said clevis defines a hole therethrough; and
    said bracket defines a hole therethrough configured in said engaged position to operationally engage said clevis when a pin is inserted through both said clevis hole and said bracket hole.

4. The missile shield assembly of claim 1, wherein said roller is configured to engage a rail portion of the building support surface.

5. The missile shield assembly of claim 1, wherein said roller includes a wheel assembly that engages the building support surface.

6. The missile shield assembly of claim 5, wherein said wheel assembly fully supports the missile shield assembly in said disengaged position.

7. A missile shield assembly for use in a building having a building support surface, comprising:
- a support frame;
- a missile shield coupled to said support frame;
- a roller coupled to said support frame and positioned to cooperatively engage the building support surface;
- a clevis coupled to said support frame, said clevis configurable between an engaged position in which the missile shield assembly is retained in place and a disengaged position in which the missile shield assembly is moveable relative the building support surface;
- a hoist rail coupled to said support frame;
- a hoist coupled to said hoist rail; and
- a hoist motor operatively coupled to said hoist and said hoist rail to translate said hoist along said hoist rail in a first direction.

8. The missile shield assembly of claim 7, wherein said hoist rail is coupled to the missile shield assembly such that said missile shield is intermediate said support frame and said hoist rail.

9. The missile shield assembly of claim 4, wherein:
- said hoist rail is elongate having a first end and a second end;
- the missile shield assembly further comprises a first transverse rail and a second transverse rail, said first and second transverse rails coupled to said support frame and positioned substantially transverse to said hoist rail;
- said hoist rail first end is coupled to said first transverse rail; and
- said hoist rail second end is coupled to said second transverse rail.

10. The missile shield assembly of claim 9, wherein said hoist rail is moveably coupled to said first and second transverse rails such that said hoist rail is moveable relative said support frame in a second direction, said second direction being substantially transverse to said first direction.

* * * * *